United States Patent
Negoto et al.

(10) Patent No.: US 8,693,313 B2
(45) Date of Patent: Apr. 8, 2014

(54) APPARATUS AND METHOD FOR SWITCHING BETWEEN REDUNDANT COMMUNICATION DEVICES

(75) Inventors: Katsuhiko Negoto, Kawasaki (JP); Akihiro Kameda, Kawasaki (JP); Isamu Fukuda, Kawasaki (JP); Atsushi Morohashi, Kawasaki (JP); Toshifumi Inoue, Kawasaki (JP); Kiyohisa Hoshino, Kawasaki (JP); Nobuyuki Fukuda, Kawasaki (JP); Kenji Fukuda, Kawasaki (JP); Kazuhiro Yasuno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 291 days.

(21) Appl. No.: 12/956,834

(22) Filed: Nov. 30, 2010

(65) Prior Publication Data

US 2011/0299386 A1  Dec. 8, 2011

(30) Foreign Application Priority Data

Dec. 1, 2009 (JP) .................................. 2009-273581

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC ........... 370/219; 370/217; 370/218; 370/220; 370/221

(58) Field of Classification Search
CPC ....... H04L 41/0654; H04L 45/28; H04L 1/22; H04L 29/14; H04L 45/22; H04L 67/2861; H04L 69/40; G06F 11/07; G06F 11/16–11/1695; G06F 11/18; G06F 11/20–11/2097

USPC .................................. 370/215–228; 714/1–46
See application file for complete search history.

(56) References Cited

U.S. PATENT DOCUMENTS 5,736,933 A * 4/1998 Segal .......................... 340/7.22
(Continued)

FOREIGN PATENT DOCUMENTS

JP 10-117182 5/1998
(Continued)

OTHER PUBLICATIONS

"Japanese Office Action" mailed by JPO and corresponding to Japanese Patent Application No. 2009-273581 on Apr. 30, 2013. Partial English Translation of the relevant parts; p. 1, line 19 to p. 2, line 16, and p. 2, line 20 to the line 22.

*Primary Examiner* — Awet Haile
*Assistant Examiner* — Eric Myers
(74) *Attorney, Agent, or Firm* — Fujitsu Patent Center

(57) ABSTRACT

A packet is transmitted from a transmitting device to an active communication device which transmits a reception history identifying the received packets to the transmitting device. The transmitting device transmits an active-mode request message to a standby communication device when having failed to receive the reception history from the active communication device within a predetermined time period. Then, the standby communication device becomes a new active communication device, and the active communication device becomes an old active communication device. The new active communication device transmits to the transmitting device a switching request message for switching a destination of the packet from the old active communication device to the new active communication device. The transmitting device retransmits packets that have been transmitted from the transmitting device to the old active communication device and have failed to be received by the old active communication device, to the new active communication device.

5 Claims, 18 Drawing Sheets

(56) References Cited

U.S. PATENT DOCUMENTS

| | | |
|---|---|---|
| 6,163,861 A | 12/2000 | Yoshioka et al. |
| 6,615,221 B2 * | 9/2003 | Warner et al. ................. 370/412 |
| 7,024,591 B2 * | 4/2006 | Moody et al. .................. 714/43 |
| 7,116,707 B1 * | 10/2006 | Armistead .................... 375/222 |
| 7,571,343 B1 * | 8/2009 | Xiang et al. ..................... 714/2 |
| 7,911,941 B2 * | 3/2011 | Kaneko ......................... 370/220 |
| 8,018,956 B1 * | 9/2011 | Deng et al. .................... 370/401 |
| 8,186,026 B2 * | 5/2012 | Xiang et al. ........................ 26/3 |
| 2006/0062142 A1 * | 3/2006 | Appanna et al. ............... 370/219 |
| 2007/0260870 A1 * | 11/2007 | Nissan et al. .................. 713/150 |
| 2010/0011139 A1 * | 1/2010 | Wang et al. ................... 710/110 |

FOREIGN PATENT DOCUMENTS

| | | |
|---|---|---|
| JP | 2002-026934 A | 1/2002 |
| JP | 2002-247113 | 8/2002 |
| JP | 2007-194815 A | 8/2007 |
| JP | 2007-306562 A | 11/2007 |

* cited by examiner

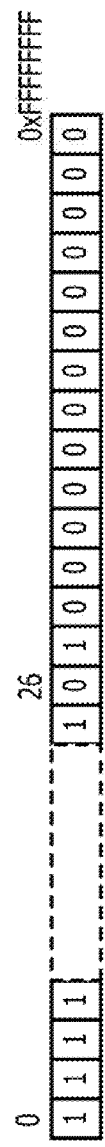
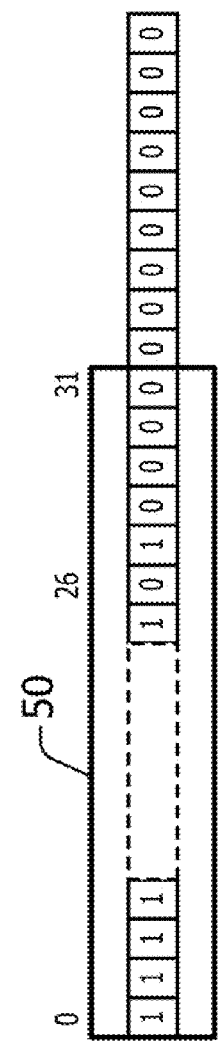
FIG. 5A
FIG. 5B

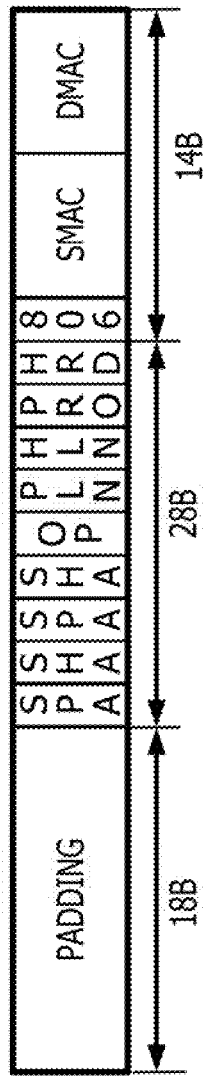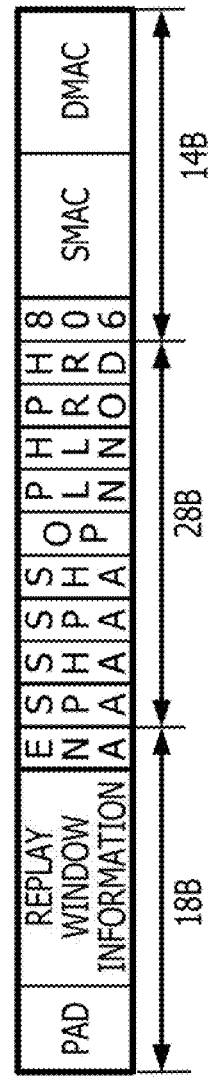
FIG. 7A
FIG. 7B

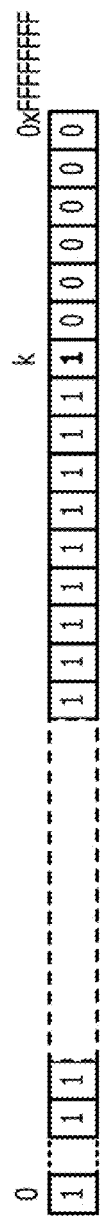
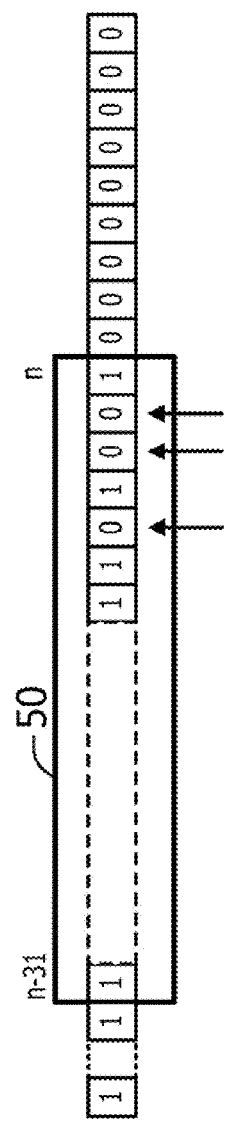
FIG. 8A
FIG. 8B

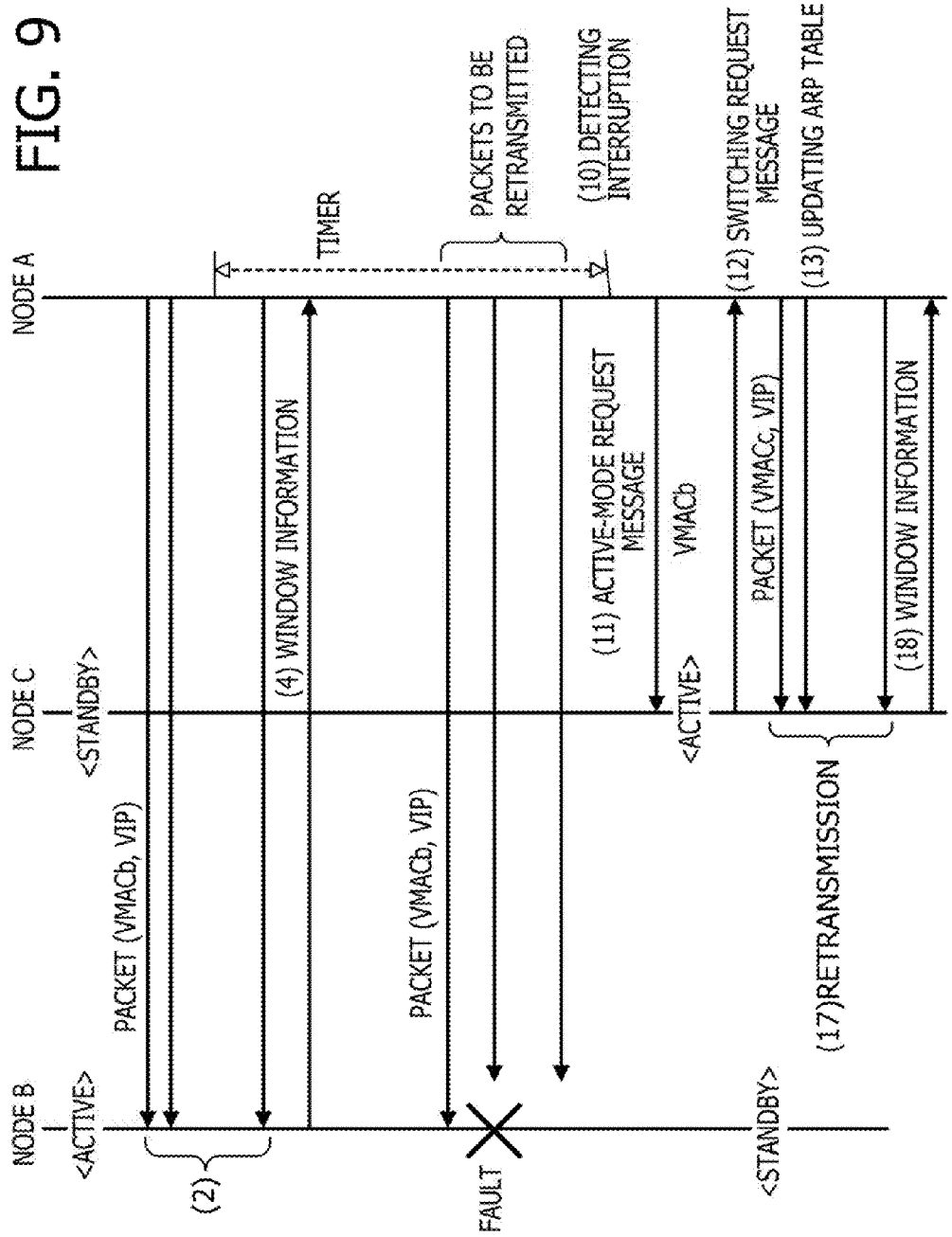

APPARATUS AND METHOD FOR SWITCHING BETWEEN REDUNDANT COMMUNICATION DEVICES

CROSS-REFERENCE TO RELATED APPLICATION

This application is based upon and claims the benefit of priority of the prior Japanese Patent Application No. 2009-273581, filed on Dec. 1, 2009, the entire contents of which are incorporated herein by reference.

FIELD

The present invention relates to apparatus and method for switching between redundant communication devices.

BACKGROUND

In recent years, communication devices provided for a network often have a redundant configuration in order to upgrade system availability. In a redundant system, communication will be continued by activating a standby communication device when a fault has occurred in an active communication device that is in an active mode.

Further, as a technique for upgrading a security, for example, Security Architecture for Internet Protocol (IPsec) is used. With an IPsec, devices among which packets are transmitted are able to perform authentication, encryption, and exchange of encryption keys, and share the encryption keys with each other. In the case of using the IPsec in a system including redundant communication devices, for example, an encryption key is exchanged between an active communication device and an opposite node with which the active communication device is to communicate, and data communication between the active communication device and the opposite node is performed with elevated levels of security. When activating a standby communication device, for example, due to a fault occurrence in the active communication device, an encryption key is exchanged between the standby communication device and the opposite node.

Japanese Laid-open Patent Publication No. 2007-306562 discloses a method for switching between network media devices, in which copying reception switching parameters from a primary network media device to a redundant network media device is performed each time a specific amount of packets are received. The method allows the redundant media device to receive packets using the copied reception switching parameters.

SUMMARY

According to an aspect of an embodiment, there is provided apparatus and method for switching between redundant communication devices that handle a packet received from a transmitting device. The redundant communication devices include an active communication device and a standby communication device, where the active communication device is in an operational mode of an active mode and capable of receiving the packet from the transmitting device, and the standby communication device is in the operational mode of a standby mode. The active communication device transmits to the transmitting device a reception history, where the reception history identifies packets that have been transmitted from the transmitting device and have been successfully received by the active communication device. The transmitting device transmits to the standby communication device an active-mode request message when the transmitting device has failed to receive a next reception history from the active communication device within a predetermined time period after lastly receiving the reception history. The standby communication device changes the operational mode thereof from the standby mode to the active mode when receiving the active-mode request message so that the standby communication device becomes a new active communication device. The new active communication device transmits to the transmitting device a switching request message for switching a destination of the packet from the active communication device to the new active communication device. The transmitting device determines packets that have been transmitted from the transmitting device to the active communication device and have failed to be received by the active communication device, based on the reception history, and retransmits the determined packets to the new active communication device.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

BRIEF DESCRIPTION OF DRAWINGS

FIG. 5A is a diagram illustrating an example of a sequence number counter;

FIG. 5B is a diagram illustrating an example of an anti-replay window;

FIGS. 7A, 7B are diagrams each illustrating an example of a switching request message, according to an embodiment;

FIG. 8A is a schematic diagram illustrating an example of a transmission sequence number counter, according to an embodiment;

FIG. 8B is a schematic diagram illustrating an example of anti-replay window information, according to an embodiment;

FIG. 9 is a diagram illustrating an example of a packet transmission sequence, according to an embodiment;

DESCRIPTION OF EMBODIMENTS

In a redundant configuration system, although an active communication device is not able to process a packet received after a fault has occurred in the active communication device, packets may be transmitted from other communication devices to the active communication device even during the time period in which the fault is ongoing in the active communication device, until the switching from the active communication device to the redundant communication device is completed. As a result, packets that were transmitted to the active communication device during the time period from the fault occurrence to the completion of the switching may be discarded, thereby causing packet loss.

Figures 1A, 1B:
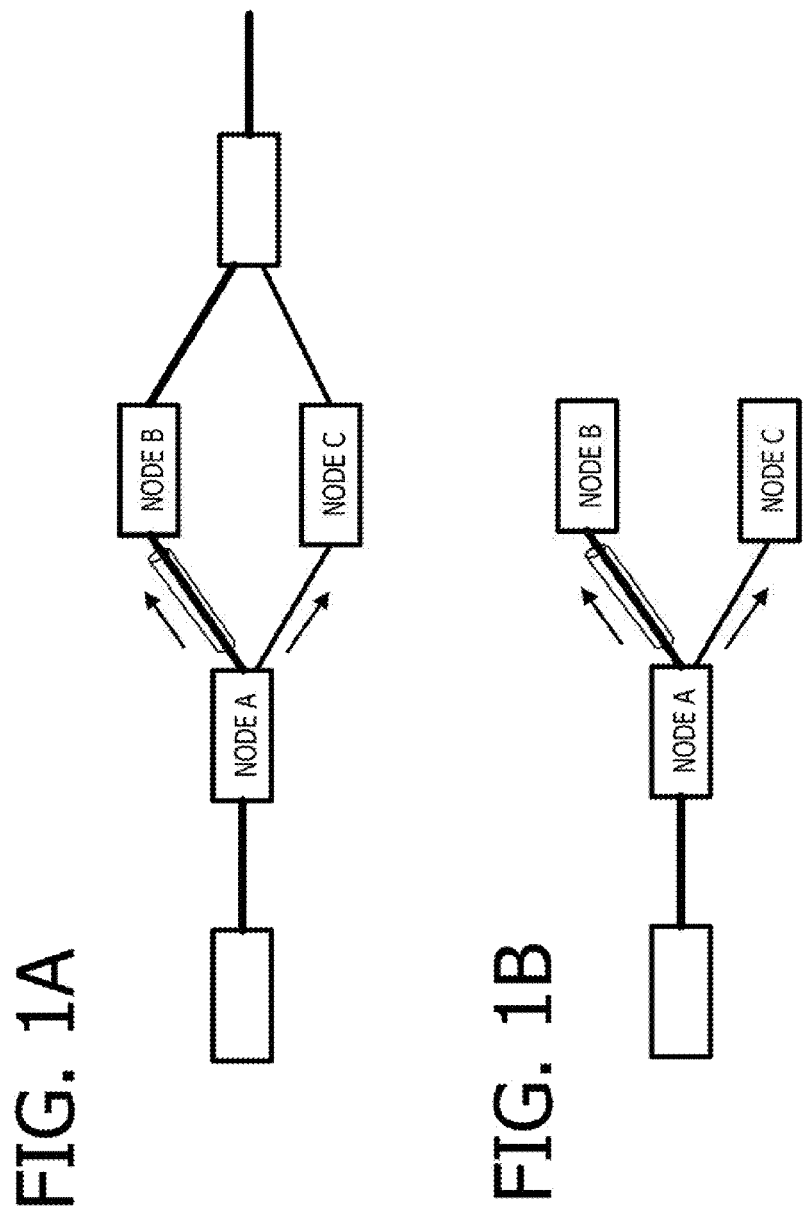
FIGS. 1A, 1B are diagrams each illustrating an example of a network configuration, according to an embodiment.

FIGS. 1A and 1B are diagrams each illustrating an example of a network configuration, according to an embodiment. The communication apparatus according to the embodiment may be applied to at least nodes A, B, and C among nodes depicted in each of FIGS. 1A, 1B in which a redundant configuration is made up of a pair of nodes B and C. In FIGS. 1A, 1B, redundant configurations are built up with respect to a relay node and a terminal node, respectively. Apparatus and method according to the embodiment may be applied to a redundant configuration of either a relay node or a terminal node. In the case of the redundant configuration of a terminal node, it is assumed that the active communication device transfers the received packets to the standby communication device. Further, it is assumed that the active communication device mirrors (or duplicates and sends) the relevant data other than the received packets to the standby communication device at regular intervals.

In the following description, it is assumed that node B is an active communication device, and node C is a standby communication device, where the active communication device means that the communication device is in an operational mode of active mode, and the standby communication device means that the communication device is in an operational mode of a standby mode. Here, node C is activated and shifts to an active mode when node B has stopped the active mode, for example, due to a fault occurrence in node B. Further, description will be given of the case of preventing packet loss caused by a fault that has occurred in node B during data transmission in the direction indicated by arrowed lines in FIGS. 1A and 1B, as a representative example. However, embodiments that will be described hereinafter may be applied to the case where packet loss is caused by factors other than a fault occurrence. For example, the active mode of the active communication device may be stopped by force for the purpose of maintenance or for some operational problem. Further, hereinafter description will be given of a pair of redundant communication devices, as a representative example. However, embodiments that will be described hereinafter may be applied to the case where three or more redundant communication devices are involved, as described later. In the following description, a communication device (such as node C) that newly shifted to an active mode at the time of completion of switching between a pair of redundant communication devices may be also described as "a new active communication device", and a communication device (such as node B) that was operated in an active mode before the switching and has lastly stopped the active mode, may be also described as "an old active communication device. Further, a communication device such as node A that transmits packets to one of the pair of redundant devices will be described as "a transmitting device" to facilitate understanding thereof. When a switching between the pair of redundant communication devices has started, "the active communication device" becomes "the old active communication device", and "the standby communication device" becomes "the new active communication device". It is also assumed that nodes B and C share security information such as encryption key that is used for performing data transmission between nodes B and A. A method for sharing security information will be described later. In the following description, "a pair of redundant communication devices" may be also described as "a pair of communication devices" in the same meaning.

In FIGS. 1A, 1B, when packets are transmitted from node A to node B, node B generates a reception history storing, for example, sequence numbers of packets that have been successfully received by node B, and transmits the reception history to nodes A or C. Further, nodes A or C may be configured to monitor whether node B is in an active mode, for example, by receiving predetermined data from node B at regular intervals. Upon detecting that node B has stopped the active mode, for example, due to a fault occurrence in node B, node C starts operation thereof, that is, node C changes the operational mode thereof from the standby mode to the active mode. At the same time, node C transmits to node A a switching request message for switching a destination of outgoing packets to be transmitted from node B to node C. Upon receiving the switching request message, node A switches a destination of the outgoing packets from node B to node C. At the same time, node A retransmits to node C packets that have failed to be received by node B, which will be hereinafter also referred to as "retransmission packets". In the case, node A is able to determine the retransmission packets by referring to the reception history of node B. In the case where node C is configured to holds the reception history of node B, node C may be configured to notify node A of identifiers identifying the retransmission packets which node B has failed to receive. Performing data transmission among nodes A, B, and C in this way, allows preventing packet losses that may occur with respect to packets that have been transmitted from node A to node B.

Figure 2:
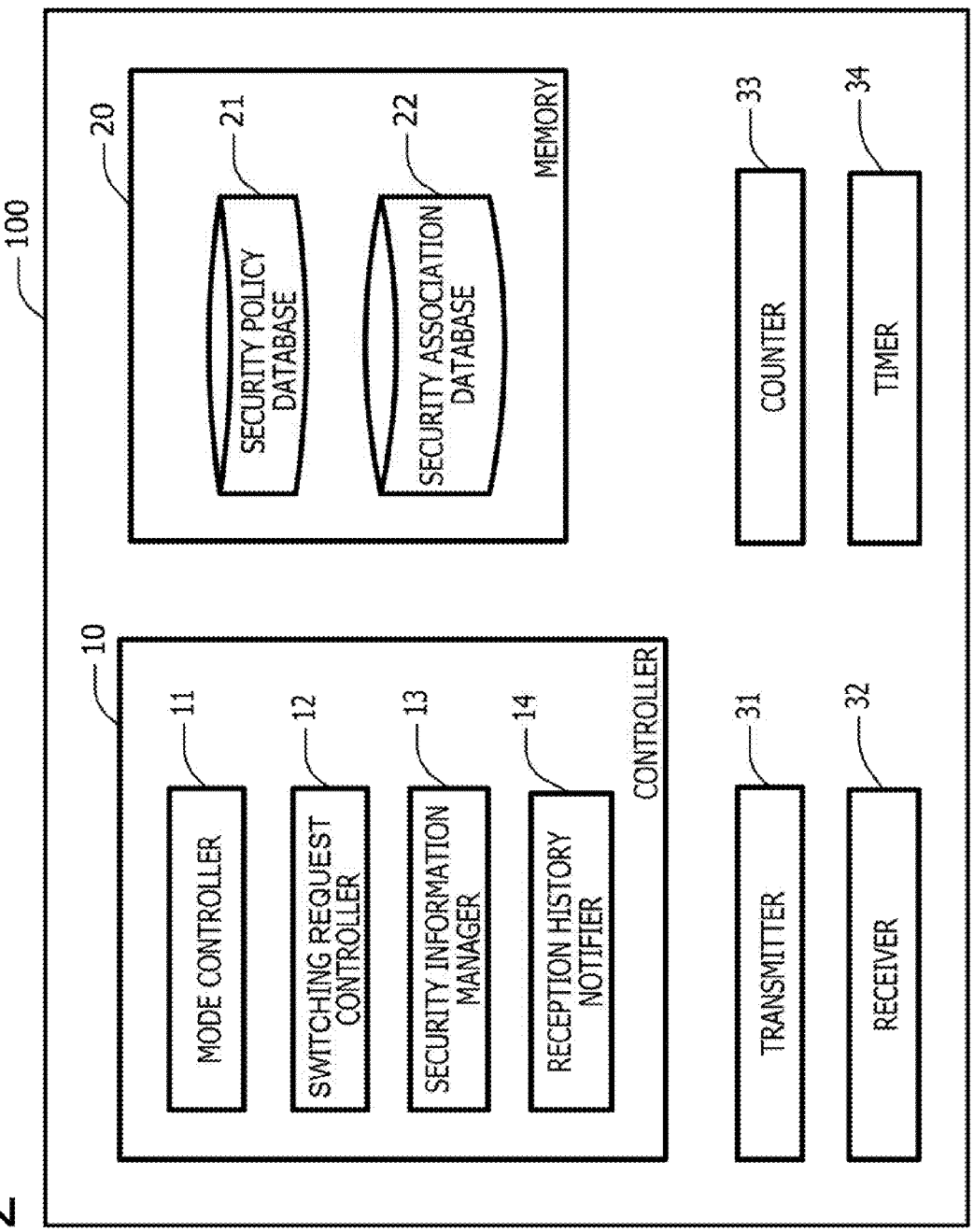
FIG. 2 is a diagram illustrating a configuration example of a communication device functioning as one of redundant communication devices, according to an embodiment.

FIG. 2 is a diagram illustrating a configuration example of a communication device functioning as one of redundant communication devices, according to an embodiment. Nodes B or C depicted in FIGS. 1A or 1B may be, for example, configured to be communication device 100 depicted in FIG. 2. The communication device 100, for example, includes controller 10, memory 20, transmitter 31, receiver 32, counter 33, and timer 34.

Controller 10 controls processing that is performed by the communication device 100. Controller 10 may be configured to include, for example, mode controller 11, switching request controller 12, security information manager 13, and reception history notifier 14. Further, controller 10 may be configured to include, for example, heartbeat controller 15 (not depicted in FIG. 2) or Virtual Router Redundancy Protocol (VRRP) controller 16 (not depicted in FIG. 2) which may function as an active-mode monitor for monitoring whether an active communication device is in an active mode or not. The details for heartbeat controller 15 and VRRP 16 will be described later. Here, controller 10 may be implemented, for example, such that a CPU provided for the communication device 100 executes programs stored in a storage medium such as a memory. Further, it is also possible to implement one or more parts of functions provided by controller 10 using hardware.

Mode controller 11 monitors whether communication device 100 is in an operational mode of a standby mode or an active mode, and changes the operational mode of communication device 100 between the standby mode and the active mode if needed. For example, mode controller 11 provided for node C in FIGS. 1A, 1B sets a standby mode to node C during the time period when node B is being operated in an active mode, and changes the operational mode of node C from the standby mode to the active mode when node B has stopped the active mode, for example, due to an fault occurrence. Conditions for changing the operational mode of the communication device will be described later.

Switching request controller 12 controls request for switching a destination of outgoing packets that are to be transmitted from a transmitting device to the active communication device. That is, switching request controller 12 of a new active communication device requests the transmitting device to switch a destination of outgoing packets, from an old active communication device to the new active communication device (node C). For example, in FIGS. 1A and 1B, when node C becomes a new active communication device and starts data reception from node A, switching request controller 12 of node C requests node A to switch a destination of outgoing packets from node B to node C. Hereinafter, a message requesting for switching a destination of outgoing packets will be described as "a switching request message". The switching request message may be implemented, for example, by using a Gratuitous Address resolution Protocol (GARP) packet or a User Datagram Protocol (UDP) packet.

Security information manager 13 controls generation of security associations. The security associations include information, for example, on an authentication and an encryption key that are to be handled between an active communication device and a destination node thereof. For example, security information manager 13 of an active communication device may be configured to generate a security association when setting between the active communication device and a transmitting device a tunnel used for transmission of packets. Further, security information manager 13 may be configured to generate a new security association by performing, at predetermined intervals, an authentication and an exchange of an encryption key between the active communication device and the destination node thereof. Further, it is also possible to generate a security association, for example, by counting the number of bytes of transmitted data and regenerating a security association when the counted value exceeds a predetermined threshold value.

Security information manager 13 of an active communication device (that will become an old active communication device) transmits security information such as a security association to a standby communication device (that will become a new active communication device). Therefore, the security information that has been used for communication between the active communication device and the transmitting device may be shared between the old active communication device and the new active communication device. Here, security information manager 13 stores the security information in security association database 22.

Reception history notifier 14 performs processing for informing a new active communication device or a transmitting device of a reception history of an old active communication device. For example, in the case where node B is the old active communication device, reception history notifier 14 of node B may be configured to transmit the reception history to the new active communication device (node C) or the transmitting device (node A) upon receiving a predetermined amount of packets from the transmitting device (node A).

As an optional extra, a communication device may be configured to transmit to a transmitting device or other redundant communication device, a keep-alive message indicating that a active communication device is being normally operated, that is, that the active communication device is in an active mode. Further, the communication device may be configured to transmit a reception history to a transmitting device or other redundant communication device, by storing the reception history into the keep-alive message. Here, controller 10 may be configured to control transmission of the keep-alive message. The keep-alive message may be configured using arbitrary messages such as a heartbeat message or a VRRP advertisement message. In the case, the communication device may be configured to further include heartbeat controller 15 (not depicted in FIG. 2) for controlling transmission of a heartbeat message or VRRP controller 16 (not depicted in FIG. 2) for controlling transmission of a VRRP advertisement message. Heart beat controller 15 or VRRP controller 16 provided for node C that is to become a new active communication device, may be configured to determine whether the active communication device is really in an active mode or not, by using keep-alive messages transmitted at regular intervals from the active communication device (node B). As described later, it is also possible to configure a system in which a transmitting device monitors whether the active communication device is being in an active mode or not, and a standby communication device does not monitor the operational mode of the active communication device.

Memory 20 stores data and programs, for example, used for processing that is to be performed by controller 10. Further, memory 20 may be configured to include security policy database (SPD) 21 and security association database (SAD) 22. Security policy database 21 stores a security policy that is set by the communication device. For example, security policy database 21 of node B stores processing conditions that are to be imposed on a packet received by node B.

Security associate database 22 holds, for example, security information such as a security associate, and a reception history of the active communication device. Here, the reception history may be configured to store packet identifiers identifying packets that have been transmitted from the transmitting device and have been successfully received by the active communication device. As a packet identifier, arbitrary information capable of identifying an individual packet, for example, a sequence number assigned to each of packets may be used. Further, a reception history may be configured using an arbitrary form of information capable of identifying packets that have been successfully received by the active communication device. For example, "anti-replay window information" of the active communication device may be used as a reception history. Hereinafter, description will be given in the case where a packet identifier is a sequence number assigned to each of packets, and a reception history is anti-replay window information of an active communication device.

Transmitter 31 controls transmission of packets to other nodes, for example, based on a request from controller 10. Receiver 32 receives a packet transmitted from other nodes. Counter 33 is used for counting the number of packets, or the number of bytes of data, that have been transmitted using a security association. Further, reception history notifier 14 of the active communication device may be configured to transmit a reception history to a transmitting device or a standby communication device that will become a new active communication device when the value of counter 33 reaches a predetermined value. Timer 34, for example, may be used so that heart beat controller 15 or VRRP controller 16 may determine whether the active communication device is being normally operated (in an active mode) or not. Heart beat controller 15 of the standby communication device determines that the active communication device has stopped the active mode, for example, due to a fault occurrence in the active communication device when a next keep-alive message has not been received within a predetermined time period after lastly receiving a keep-alive message. In a manner similar to heart beat controller 15, VRRP controller 16 may also be configured to determine that the active communication device has stopped the active mode, for example, due to a fault occurrence in the active communication device when a next keep-alive message has not been received within a predetermined time period after lastly receiving a keep-alive message.

Figure 3:
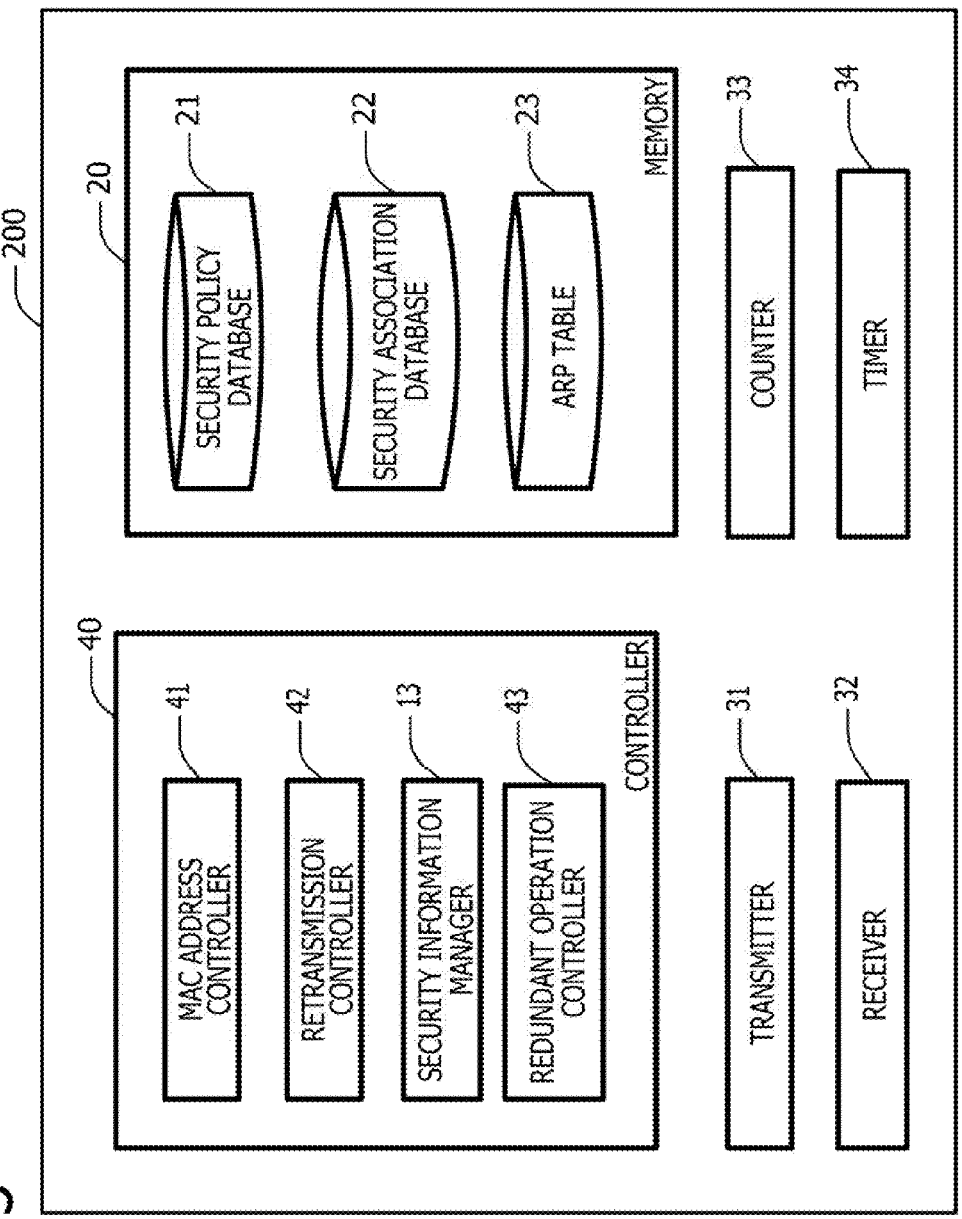
FIG. 3 is a diagram illustrating a configuration example of a transmitting device, according to an embodiment.

FIG. 3 is a diagram illustrating a configuration example of a transmitting device, according to an embodiment. A transmitting device 200 depicted in FIG. 3 may function as a device, like node A depicted in FIG. 1, that transmits packets to redundant communication devices. In the example depicted FIG. 3, description will be given of the case where a GARP packet is used as a switching request message.

A transmitting device 200 includes controller 40, memory 20, transmitter 31, receiver 32, counter 33, and timer 34. Controller 40 may be configured to include Media Access Control (MAC) address controller 41 and retransmission controller 42 as well as security information manager 13. Here, as described later, controller 40 may be configured to further include redundancy controller 43. Memory 20 may be configured to include Address Resolution Protocol (ARP) table 23, in addition to security policy database 21 and security association database 22. Here, security information manager 13, security policy database 21, security association database 22, transmitter 31, receiver 32, counter 33, and timer 34 provided for transmitting device 200 may be configured in a manner similar to those provided for communication device 100 depicted in FIG. 2.

Retransmission controller 42 controls retransmission of packets that are to be retransmitted to a new active communication device, and hereinafter also referred to as "retransmission packet". Upon receiving a switching request message, retransmission controller 42 requires transmitter 31 to retransmit the retransmission packets. Here, in the case where a reception history of an old active communication device is stored in security association database 22 of the transmitting device 200, retransmission controller 42 retransmits, as the retransmission packets, packets that have sequence numbers not included in the reception history, to a new active communication device. Meanwhile, as described later, in the case where the reception history has been notified from a new active communication device, retransmission controller 42 transmits, as the retransmission packets, packets that have sequence numbers not included in the notified reception history, to a new active communication device.

Upon receiving a switching request message from a new active communication device, retransmission controller 42 of transmitting device 200 changes a destination of outgoing packets, from an old active communication device to the new active communication device by changing ARP table 23. Here, ARP table 23 may be configured, for example, to store a shared Internet Protocol (IP) address that is assigned to redundant communication devices in association with a MAC address of one of redundant communication devices that is allowed to use the shared IP address. Here, the shared IP address is an IP address that is to be shared by redundant communication devices and to be used exclusively by one of redundant communication devices at the same time point. For example, in the case where node B of FIG. 1 is in an active mode, ARP table 23 provided for node A stores a shared IP address assigned to a pair of nodes A and B in association with the MAC address of node B that is currently using the shared IP address. When node A receives a switching request message from node C that has become a new active communication device, for example, due to a fault occurrence in node B, retransmission controller 42 of node A changes ARP table 23 thereof so that the ARP table 23 stores the shared IP address assigned to the pair of nodes B and C in association with the MAC address of node C that has been newly allowed to use the shared IP address. Here, ARP table 23 may be also configured to store a Virtual Internet Protocol Address (VIP) as a shared IP address or a virtual MAC address (VMAC) as a MAC address.

When an outgoing packet is put into transmitter 31, MAC address controller 41 extracts the MAC address of a destination of the outgoing packet from ARP table 23, and notifies transmitter 31 of the extracted MAC address. For example, in the case where, out of a pair of communication devices (nodes B and C), node B is being operated and in an active mode, a shared IP address that is to be assigned to the pair of nodes B and C is stored in ARP table 23 in association with the MAC address of node B. Therefore, MAC address controller 41 extracts from ARP table 23 the MAC address of node B, as a destination MAC address of the outgoing packet, and notifies transmitter 31 of the extracted MAC address. Then, transmitter 31 transmits the outgoing packet to the extracted MAC address notified by MAC address controller 41.

Redundancy controller 43 may be invoked when transmitting device 200 has determined that an active communication device has stopped the active mode, fort example, due to a fault occurrence in the active communication device. Redundancy controller 43 may be configured to measure, using timer 34, intervals at which transmitting device 200 receives a reception history from the active communication device. Redundancy controller 43 may be configured to determine that the active communication device has stopped the active mode when redundancy controller 43 have failed to receive a new reception history from the active communication device within a predetermined time period after lastly receiving a reception history from the active communication device. Further, redundancy controller 43 may also be configured to determine whether the active communication device is in an active mode, based on receiving intervals of data other than a reception history that is transmitted from the active communication device, such as a keep-alive message.

(First Embodiment)

According to an embodiment, security information is shared between an active communication device and a standby communication device to reduce the time required for switching from an old active communication device to a new active communication device and initiating reception of packets by the new active communication device. First, description will be given of a method for sharing security information between an old active communication device and a new active communication device. Hereinafter, description will be given on the assumption that a security association is used as security information. However, it is also possible to change the type of security information depending on the implementation of redundant communication devices.

Figure 4:
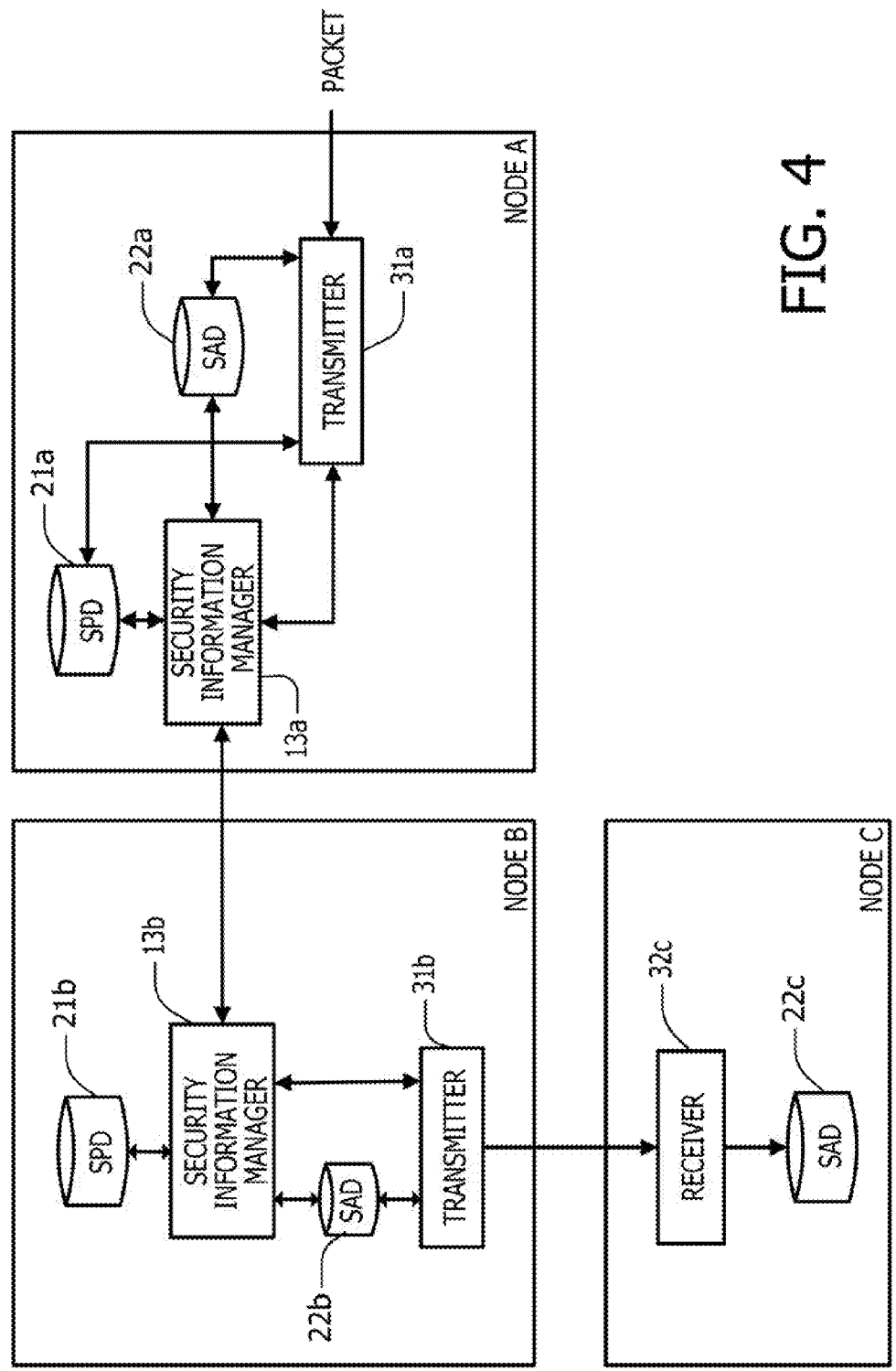
FIG. 4 is a schematic diagram illustrating a method for generating and updating a security association, according to an embodiment.

FIG. 4 is a schematic diagram illustrating a method for generating and updating a security association, according to an embodiment. Description will be given of generation of a security association when setting a tunnel between a transmitting device (node A) and an active communication device (node B), with reference to FIG. 4. In the case, an active communication device (node B) informs a standby communication device (node C) of the generated security association so that nodes A, B, and C share the generated security association. Although communication device 100 depicted in FIG. 2 may be applied to node B and node C, and transmitting device 200 depicted in FIG. 3 may be applied to node A, for the convenience of explanation, only components essential for generating and updating a security association are depicted within each of nodes A, B, and C in FIG. 4. Further, in the following description, operation numbers in parentheses will be added to each of the operations to be performed, for the convenience of explanation.

In operation (1), node A receives or generates a packet having, as a destination address, a shared IP address that has been assigned to a pair of redundant communication devices: nodes B and C. MAC address controller 41 of node A (not depicted in FIG. 4) extracts a destination MAC address of the packet by referring to ARP table 23, and informs transmitter 31*a* of the extracted destination MAC address of the packet. In this case, MAC address controller 41 informs transmitter 31*a* of, as a destination MAC address of the packet, the MAC address of node B that is in an active mode.

In operation (2), transmitter 31*a* of node A searches for a security policy corresponding to the destination IP address of the packet, and further searches for the corresponding security association when an IPsec communication is designated. That is, transmitter 31*a* searches security database (SPD) 21*a* for a security policy that is to be applied to packets destined for the destination IP address of the packet. When the security policy has been found and a IPsec transmission is being set to the found security policy, transmitter 31*a* searches security association database (SAD) 22*a* for a security association that is being set as to packets destined for the destination IP address. In the case, a security association as to packets destined for the destination IP address is not stored in security association database (SAD) 22*a* since there exist no tunnels established between nodes A and B.

In operation (3), transmitter 31*a* of node A requires security information manager 13*a* to generate a security association that is to be used for transmission between nodes A and B.

In operation (4), security information manager 13*a* of node A performs negotiation process for Internet Key Exchange (IKE), such as an encryption key generation or an authentication, by accessing security information manager 13*b* of node B. In this negotiation process, security information managers 13*a* and 13*b* generate a security association, for example, by using an IKE_SA_INIT message or an IKE_AUTH message.

In operation (5), security information manager 13*a* of node A stores the generated security association in security association database (SAD) 22*a*. In the similar manner, in node B, security information manager 13*b* stores the generated security association in security association database (SAD) 22*b*. In the above mentioned operations (2) to (5), it is assumed that security information managers 13*a* and 13*b* are able to, as needed, access security policy databases (SPDs) 21*a* and 21*b*, respectively.

In operation (6), in node B, security information manager 13*b* sends to transmitter 31*b* a notification (a SA establishment notification) indicating that a security association has been generated.

In operation (7), transmitter 31*b* of node B, upon receiving the SA establishment notification, acquires the generated security association by accessing security association database (SAD) 22*b*.

In operation (8), transmitter 31*b* of node B transmits the acquired security association to node C that is in a standby mode.

In operation (9), receiver 32*c* of node C stores the received security association in security association database (SAD) 22*c*.

In this way, node A transmits packets to node B using the security association generated according to the above mentioned operations. Here, the generated security association has two life times (a soft lifetime and a hard lifetime) set thereto. Therefore, a new security association is needed to be generated between nodes A and B according to the following operations before the hard lifetime set to the security association expires.

In operation (10), when a packet destined for the pair of redundant communication devices (nodes B and C) has been input to transmitter 31*a* of node A, MAC address controller 41 of node A (not depicted in FIG. 4) informs transmitter 31*a* of the MAC address of node B, as an destination MAC address of the packet. Transmitter 31*a* of node A extracts a security association corresponding to transmission between nodes A and B from security association database (SAD) 22*a*, and informs security information manager 13*a* of the extracted security association.

In operation (11), security information manager 13*a* of node A determines whether the security association extracted from security association database (SAD) 22*a* is valid or not. For example, security information manager 13*a* determines whether a soft lifetime of the security association has expired or not, using an elapsed time from the generation of the security association or using the byte count of data that have been transmitted according to the security association. When it is determined that the security association has not expired yet, security information manager 13*a* informs transmitter 31*a* of the determined result. Then transmitter 31*a* transmits the packet to node B using the existing security association.

In operation (12), when it is determined that the security association has expired, security information manager 13*a* generates a new security association that is to be used for transmitting packets from node A to node B, by performing an IKE negotiation process in which a CREATE_CHILD_SA message is used, in a manner similar to operations (4) and (5). Further, nodes B and C may share the new security association by performing operations similar to the above mentioned operations (6) to (9).

In operation (13), the security association generated by the operation (5) is cancelled when the hard lifetime expires.

When the generation process of the new security association in the operation (12) has not completed before cancelling the security association generated by the operation (5), a new security association to be used for transmitting packets from node A to node B is generated according to the above operations (1) to (5). Further, nodes B and C share the generated new security association according to the operations from (6) to (9).

When a current sequence number assigned to a packet to be transmitted reaches the maximum value of "0xFFFFFFFF" or "0xFFFFFFFF_FFFFFFFF" before a new security association is generated between nodes A and B according to the operations (10) to (12), the new security association becomes void. In this case, a new security association used for transmitting packets from node A to node B may be also generated according to the above operations (1) to (5). Further, nodes B and C share the security associate with each other according to the above operations (6) to (9).

According to the above operations, a new active communication device may hold the same security association that have been used for transmission between the old active communication device and the transmitting device, and the same security association may be used for transmitting packets after switching between the pair of redundant communication devices.

After a security association has been generated, a transmitting device starts transmission of packets to an active communication device using the generated security association, as described above with reference to FIG. 4. In the case, the transmitting device adds a sequence number to each of packets to be transmitted. Sequence numbers are serial numbers that are appended to packets that are transmitted using the security association, and, for example, the sequence numbers may be configured by using unsigned integer numbers staring from value "0". In this case, controller 40 of transmitting device 200 may be configured to initialize counter 33 at value "0" when a security association has been generated between transmitting device 200 and the active communication device. Further, controller 40 of transmitting device 200 may be configured to increment counter 33 by "1" every time transmitting a packet after the initialization of counter 33, and may be configured to use the value of counter 33 as a sequence number to be assigned to each of packets.

Meanwhile, an active communication device may be configured to include a reception sequence number counter, for example, in memory 20, and may be configured to record the reception status of packets in the sequence number counter. Hereinafter, the reception sequence number counter will be also described simply as "the sequence number counter". The sequence number counter may be configured using a bit string (or a character string representing a bit string) in which each bit is allocated to a sequence number assigned to each of packets. The active communication device initializes the sequence number counter when a security association has been generated. When the active communication device receives a packet, controller 10 of the active communication device set value "1" to a bit corresponding to the sequence number assigned to the received packet. For example, upon receiving a packet assigned a sequence number of "0", controller 10 of the active communication device changes the value of the most significant bit, which is allocated for recording information on reception of the packet assigned a sequence number of "0", from "0" to "1". The example depicted in FIG. 5A illustrates an example of a sequence number counter in which, after receiving packets assigned sequence numbers raging from "0" to "25", a transmitting device has received a packet assigned a sequence number "27" before receiving a packet assigned a sequence number "26".

FIG. 5B is a diagram illustrating an example of an anti-replay window. Anti-replay window 50 is used for protecting an active communication device from a replay attack, and determines the value range of sequence numbers of packets that are allowed to be received. Information that includes bit values included in anti-replay window 50 along with a predetermined sequence number such as the minimum or maximum number among the sequence numbers of packets whose reception states are recorded in anti-replay window 50, will be hereinafter referred to as "anti-replay window information" or simply "window information".

Here, information recorded in anti-replay window 50 may be considered to be a reception history identifying reception states of packets having sequence numbers that are allowed to be received by an active communication device. For example, in the example depicted in FIG. 5b, anti-replay window 50 is 32 bits in length, and a reception history regarding packets having sequence numbers from "0" to "31" is recorded in anti-replay window 50. At this time, when the active communication device receives a packet having a sequence number of "32", controller 10 of the active communication device shifts anti-replay window 50 by one bit rightward. Therefore, after anti-replay window 50 has been shifted, anti-replay window information holds a reception history regarding packets having sequence numbers from "1" to "32". In this way, in the case of anti-replay window 50 with 32 bits in width, controller 10 of an active communication device records a reception history regarding packets having sequence numbers from "n–31" to "n" where n is the maximum sequence number among packets received by the active communication device.

Controller 10 provided for an active communication device, at regular intervals, reads out data from anti-replay window 50, generates anti-replay window information, and transmits the generated anti-replay window information to a transmitting device. The transmitting device holds the anti-replay window information received from the active communication device as a reception history of packets received by the active communication device. Here, arbitrary method may be used for selecting a predetermined sequence number that is to be included in the anti-replay window information. For example, the maximum sequence number among packets whose reception states are recorded in the anti-replay window 50 may be selected as the predetermined sequence number. The transmitting device determines sequence numbers of packets that have failed to be successfully received by the active communication device, using the predetermined sequence number and anti-replay window information notified by the active communication device. A method for determining sequence numbers will be described later.

When switching between a pair of redundant communication devices has been performed, for example, due to a fault occurrence in an active communication device, the transmitting device starts transmission of packets to a new active communication device. At this time, the transmitting device compares the counter value of counter 33 with sequence numbers of packets that are determined to be received by the old active communication device with reference to the reception history of the old active communication device. Controller 40 of the transmitting device determines packets whose sequence numbers are less than or equal to the counter value and whose reception states indicating successful reception are not recorded in the anti-replay window information, to be packets that have failed to be successfully received by the old active communication device. Then, controller 40 retransmits the packets that have failed to be received by the old active communication device, to the new active communication device. For example, in the case where the switching has been performed when the counter value of the transmitting device is "27", packets with sequence numbers from "0" to "27" have been transmitted to the old active communication device. Assuming that anti-replay window information that has been transmitted from the old active communication device is the same as information represented by anti-replay window 50 depicted in FIG. 5B, controller 40 of the transmitting device determines that a packet with sequence number "26" has failed to be successfully received by the old active communication device. Then the transmitting device transmits the packet with sequence number "26" to the new active communication device.

Intervals at which an active communication device transmits anti-replay window information to a transmitting device may be set at an arbitrary value. However, the number of packets that are transmitted from the transmitting device to the active communication device during a time period from transmitting a piece of anti-replay window information until transmitting a next piece of anti-replay window information, is need to be smaller than the number of bits that are able to be recorded in anti-replay window 50. For example, in the case where anti-replay window 50 used by node B of FIG. 4 is 32 bits in width, a system may be configured such that a piece of anti-replay window information is transmitted from node B to node A once for each time period in which 16 packets are transmitted from node A to node B. In this way, a system is configured so that the number of packets that are transmitted from a transmitting device within a time period from transmitting a piece of anti-replay window until transmitting a next piece of anti-replay window information is smaller than the number of bits that are able to be recorded in anti-replay window 50. This allows the transmitting device to determine whether each of outgoing packets has been successfully received by the active communication device or not, by referring to anti-replay window information.

In the example depicted in FIG. 5A, it is possible to determine whether each of packets with sequence numbers from "0" to "0xFFFFFFFF" has been successfully received by the active communication device or not. However, the number of packets that are able to be managed by a sequence number counter may be changed depending on the implementation of a transmitting device and redundant communication devices. In the same manner, the amount of information included in anti-replay window information is not limited to 32 bits in length, and may be changed to an arbitrary value.

Figure 6:
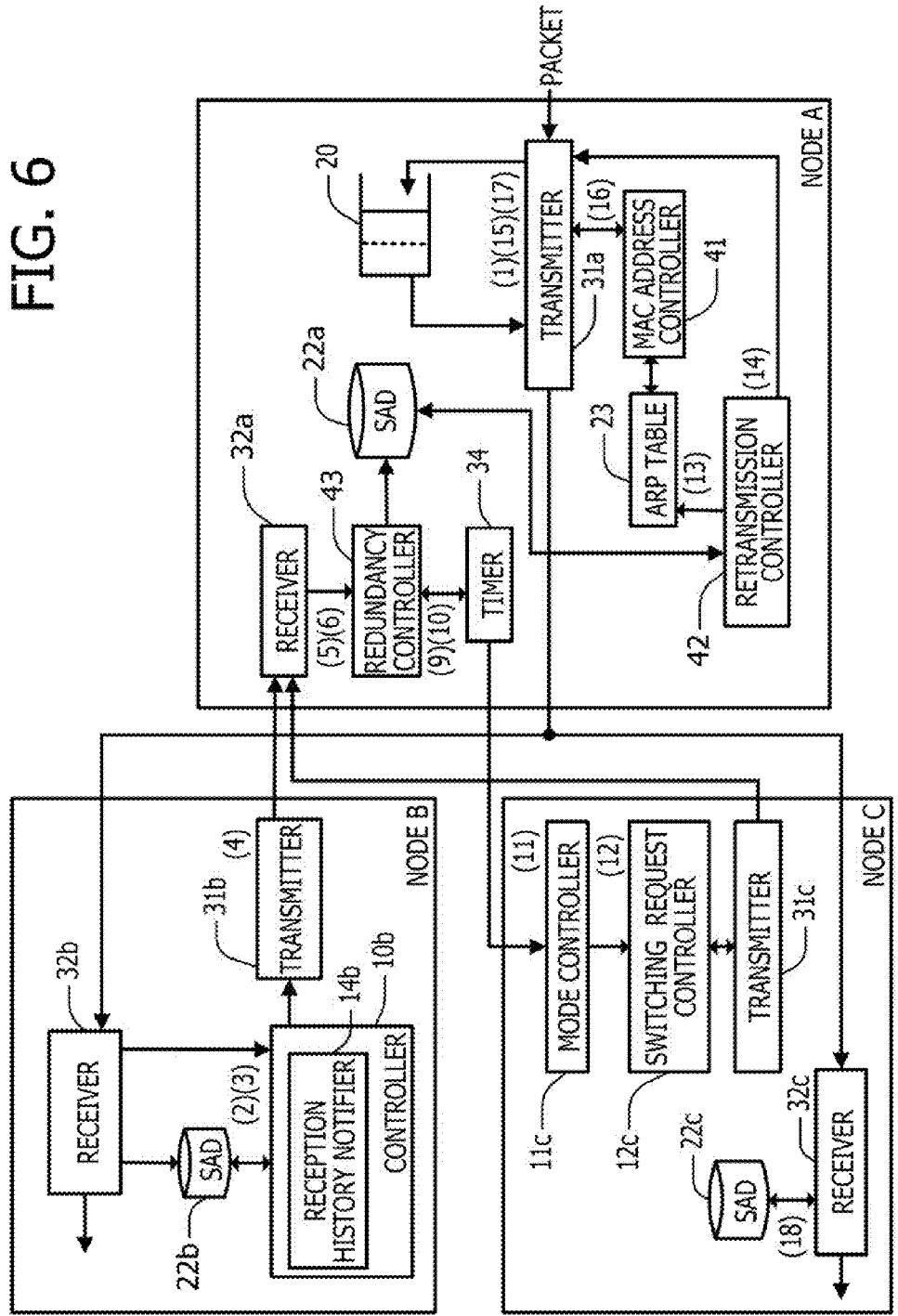
FIG. 6 is a diagram illustrating an example of an operational sequence for switching between redundant communication devices, according to an embodiment.

FIG. 6 is a diagram illustrating an example of an operational sequence for switching between redundant communication devices, according to an embodiment. Description will be given of operations of each node before switching between the pair of redundant communication devices (operations from (1) to (7)) and after the switching between the pair of redundant communication devices (operations from (8) to (18)), with reference to FIG. 6. Hereinafter, it is assumed that an old active communication device and a new active communication device share a security association according to the method previously described with reference to FIG. 4. In the case, node A is operated as a transmitting device, node B is operated as an old active communication device, and node C is operated as a new active communication device. Further, in the following description, for the convenience of explanation, operation numbers in parentheses will be added to each of the operations to be performed, and the same operation numbers are added to the relevant parts in FIG. 6.

In operation (1), upon receiving a packet, transmitter 31a of node A buffers the received packet into memory 20 on a timely basis. Transmitter 31a read out a packet to be processed from memory 20, and transmits the packet to a communication device having the MAC address informed by MAC address controller 41. Here, it is assumed that node B, which an active communication device, is being operated normally. In the case, transmitter 31a is informed of the MAC address of node B by MAC address controller 41, and the packet is transmitted to node B.

In operation (2), when receiver 32b of node B receives the packet, controller 10b of node B updates a sequence number counter. Further, controller 10b stores anti-replay window information in security association database 22b on a timely basis.

In operation (3), reception history notifier 14b of node B monitors, for example, information on an elapsed time or the number of received packets after lastly transmitting a piece of anti-replay window information to node A, and determines the timing at which anti-replay window information is to be transmitted, based on the monitored information. When transmitting a piece of anti-replay window information, reception history notifier 14b read out the piece of anti-replay window information from security association database 22b, sends the piece of anti-replay window information to transmitter 31, and at the same time requires transmitter 31b to transmit the piece of anti-replay window information to node A.

In operation (4), transmitter 31b of node B transmits the piece of anti-replay window information to node A.

In operation (5), receiver 32a of node A, upon receiving the piece of anti-replay window information, sends the received piece of anti-replay window information to redundancy controller 43. Redundancy controller 43, upon receiving the piece of anti-replay window information, resets the value of timer 34.

Timer 34 of node A is reset by redundancy controller 43 of node A (not depicted in FIG. 6) each time redundancy controller 43 receives a piece of anti-replay window information, thereby measuring an elapsed time from node A receiving a piece of anti-replay window information from node B, until node A receiving a next piece of anti-replay window information from node B. Redundancy controller 43 monitors an elapsed time from lastly receiving a piece of anti-replay window information, by periodically checking the value of timer 34. Here, redundancy controller 43 holds a threshold value (Tth) used for determining whether node B has stopped the active mode, for example, due to a fault occurrence in node B, and compares the value of timer 34 with the threshold value "Tth". For example, redundancy controller 43 may be configured to determine that node B has stopped the active mode, for example, due to a fault occurrence in node B when the value of timer 34 is greater than the threshold value "Tth".

In operation (6), redundancy controller 43 stores the piece of anti-replay window information transmitted from node B in security association database 22a.

In operation (7), the above operations from (1) to (6) are repeated by nodes A and B.

In operation (8), when a fault has occurred in node B, node B becomes unable to receive a packet from node A. Further, node B becomes unable to update anti-replay window information, and unable to transmit anti-replay window information to node A.

In operation (9), redundancy controller 43 of node A periodically checks the value of timer 34. However, in the case, the value of timer 34 is not reset since node A has not received anti-replay window information from node B after the fault occurrence in node B. Therefore, timer 34 keeps measuring an elapsed time from node A lastly receiving anti-replay window information.

In operation (10), upon detecting that the value of timer 34 exceeds the threshold value "Tth", redundancy controller 43 determines that node B has stopped the active mode, for example, due to a fault occurrence in node B. Then, redundancy controller 43 of node A transmits a message for requesting an active mode (an active-mode request message) to node C. In the case, redundancy controller 43 of node A may be configured to directly transmit the active-mode request message to mode controller 11$c$ of node C, or may be configured to transmit the active-mode request message to mode controller 11$c$ of node C via timer 34 of node A or transmitter 31$a$ of node A.

In operation (11), mode controller 11$c$ of node C, upon receiving an active-mode request message, changes an operational mode of node C from a standby mode to an active mode.

In operation (12), mode controller 11$c$ of node C informs switching request controller 12$c$ that the operational mode of node C has been changed to the active mode, and node C has become a new active communication device. Then, switching request controller 12$c$ generates a switching request message, and transmits the generated switching request message to node A via transmitter 31$c$.

FIGS. 7A, 7B are diagrams each illustrating an example of a switching request message, according to an embodiment. In the example depicted in FIG. 7A, a switching request message is configured by using a GARP packet. In the case, description will be given of the case where ARP table 23 stores a virtual IP address and a virtual MAC address, and a virtual IP address is assigned, as a shared IP address, to a pair of redundant communication devices: nodes B and C. The GARP packet stores a Source Protocol Address (SPA) and a Sender Hardware Address (SHA) that are indicative of source addresses of the GARP packet. For example, node C stores a shared IP address assigned to the pair of nodes A and B in SPA field, and stores a virtual MAC address of node C in SHA field. Here, each of the shared IP address and the virtual MAC address is stored, in duplicate, into two fields within the switching request message as depicted in FIG. 7A. The number of octets used for description of SPA is stored in a PLN (octet length of protocol address) field, and the number of octets used for description of SHA is stored in a HLN (octet length of hardware address) field. Further, node B stores, in OP field, data relating to a padding field, and stores, in PRO (protocol type) field, information identifying a protocol used for data transmission. The GARP packet further includes a HRD (hardware type) field, a protocol identifier field, a SMAC (source MAC address) field, a DMAC (destination MAC address) field, and a PAD (padding) field. In the example of FIG. 7A, a protocol identifier "0x0806" identifying an ARP packet is stored in the protocol identifier field. Node B transmits the GARP packet as depicted in FIG. 7A to node A. In the example of FIG. 7A, although a packet, including fields that are used by a GARP packet, is depicted as a switching request packet, configuration of fields in the packet may be changed appropriately.

In operation (13), receiver 32$a$ of node A, upon receiving a switching request message, sends the received switching request message to retransmission controller 42. Retransmission controller 42 updates ARP table 23 by analyzing the received switching request message. At the time before updating ARP table 23, the shared IP address assigned to the pair of communication devices (nodes B and C) is associated with the MAC address of the old active communication device (node B). Retransmission controller 42, according to the received switching request message, associates the shared IP address with a new active communication device (node C) by storing a pair of the shared IP address and the MAC address of the new active communication device (node C) into ARP table 23.

In operation (14), retransmission controller 42 of node A further requests transmitter 31$a$ to retransmit packets that have failed to be received by the old active communication device (node B). Retransmission controller 42 reads out a reception history that is stored in security association database 22$a$, determines, based on the reception history, sequence numbers of packets that have failed to be received by the old active communication device (node B) and notifies transmitter 31$a$ of the determined sequence numbers of the packets.

FIG. 8A is a schematic diagram illustrating an example of a transmission sequence number counter, according to an embodiment. Retransmission controller 42 of a transmitting device checks a history of packets that has been transmitted from the transmitting device (a transmission history), for example, using a count value that is counted up at the time of transmitting a packet. Further, retransmission controller 42 may be configured to store the transmission history in memory 20 using a transmission sequence number counter as depicted in FIG. 8A. The transmission sequence number counter may be configured to be a bit string in which each bit is assigned to one of transmission sequence numbers on a one-to-one basis in a manner similar to a reception sequence number counter. For example, in the case of node A transmitting packets with sequence numbers from "0" to "k", a transmission history may be stored in memory 20 as a bit string in which "1" is set to each of "k+1" bits starting from the leftmost bit of the bit string, thereby indicating that packets with sequence numbers from "0" to "k" have been already transmitted. Hereinafter, description will be given on the assumption that node A has already transmitted packets with sequence numbers from "0" to "k" at the time when node A receives a switching request message.

FIG. 8B is a schematic diagram illustrating an example of anti-replay window information using a form of anti-replay window 50, according to an embodiment. In FIG. 8B, anti-replay window information indicates whether each of packets with sequence numbers from "n−31" to "n" has been received successfully by node B. In FIG. 8B, for the sake of simplifying comparison with FIG. 8A, anti-replay window 50 is depicted together with a sequence number counter stored in node B. The example depicted in FIG. 8B indicates that packets with sequence numbers "n−4", "n−2", and "n−1" (denoted by arrowed lines in FIG. 8B) have failed to be received by node B. Also packets with sequence numbers greater than "n" and equal to or smaller than "k" have not been received by node B. As described above, retransmission controller 42 determines packets to be retransmitted (also referred to as "retransmission packets") based on anti-replay window information and the sequence numbers of packets that have been transmitted.

In operation (15), transmitter 31$a$ of node A read out a packet to be retransmitted, from a buffer or memory 20, and query MAC address controller 41 about a destination MAC address of the packet to be retransmitted.

In operation (16), MAC address controller 41 of node A determines a MAC address corresponding to the destination IP address of the packet, by referring to ARP table 23. In the case, since ARP table 23 has been updated in operation (13), the MAC address of node C that becomes a new active communication device is associated with the destination IP address of the packet.

In operation (17), MAC address controller 41 of node A informs transmitter 31a of, the MAC address of node C as a destination MAC address of the packet, and then transmitter 31a retransmits the packet to node C. Here, as previously described, nodes C and B share the security association used for data communication with node A. Therefore, transmitter 31a retransmits the packet to node C (the new active communication device) using the existing security association that has been used for data communication with node B (then old active communication device).

In operation (18), upon receiving the packet, node C stores the sequence number of the received packet in a sequence number counter. Further, node C stores anti-replay window information into security association database 22c on a timely basis, and at the same time transmits the anti-replay window information to node A.

In this way, a transmitting device, upon receiving a switching request message, compares a transmission history of the transmitting device with a reception history of an old active communication device. Further, after completion of switching between a pair of redundant communication devices, the transmitting device retransmits, to a new active communication device, retransmission packets that have been transmitted from the transmitting device and have failed to be received by the old active communication device. For example, packets that have been transmitted to the old active communication device during the time period from the fault occurrence in the old active communication device until the completion of switching between the pair of redundant communication devices may be retransmitted, as the retransmission packets, to the new active communication device. This may prevent occurrence of packet losses caused by switching between the pair of redundant communication devices.

Further, a transmitting device may be configured to, not only acquire a reception history of an active communication device, but also determine whether the active communication device is normally operated or not, by monitoring transmission intervals of anti-replay window information from the active communication device. Thus, the transmitting device may manage both the operational state and the reception history of the active communication device, and may control switching between the pair of redundant communication devices together with the retransmission of packets that have failed to be received by the old active communication device.

FIG. 9 is a diagram illustrating an example of a packet transmission sequence, according to an embodiment. Description will be given of time-varying operations of each node when performing switching between a pair of redundant communication devices together with retransmission of packets. Numbers in parentheses indicates the corresponding numbers that are used when describing a sequence of operations with reference to FIG. 6. Further, in the example of FIG. 9, it is assumed that ARP table 23 stores a virtual IP address, as a shared IP address assigned to a pair of communication devices (nodes B and C), in association with a virtual MAC address that is used by node B or node C.

Before a fault occurrence in node B, in ARP table 23 provided for node A, a virtual IP address (VIP) assigned to the pair of communication devices (nodes B and C), is associated with the MAC address of node B (VMACb). Therefore, node A transmits packets to node B, and node B receives the packets that have been transmitted from node A to node B. Node B transmits anti-replay window information to node A at regular intervals. Node A stores the received anti-replay window information in security association database 22a as a reception history of node B, and, at the same time, measures reception intervals of the anti-replay window information to check the operational mode of node B.

When a fault has occurred in node B, node B becomes unable to receive packets from node A, and packets that have been transmitted from node A to node B after that are discarded. Further, since node B is unable to transmit anti-replay window information to node A, redundancy controller 43 of node A determines that node B has stopped the active mode thereof, for example, due to a fault occurrence in node B, as previously described in operations (9) and (10). Accordingly, packets that have been transmitted from node A during the time from the fault occurrence in node B until node A detects stopping of the active mode of node B, may be discarded. In FIG. 9, "packets to be retransmitted" indicates packets that have failed to be received by node B and discarded.

Node A transmits an active-mode request message to node C, and, upon receiving a switching request message from node C, updates ARP table 23. In the updated ARP table 23, the virtual IP address (VIP) allocated, as a shared IP address, to the pair of communication devices (nodes B and C), is associated with the MAC address of node C (VMACc). After updating ARP table 23, node A transmits packets to be retransmitted to node C that has become a new active communication device.

As mentioned above, a transmitting device may perform switching between a pair of redundant communication devices together with retransmission of packets that have dropped due to the switching. Further, when retransmitting dropped packets, retransmission controller 42 of node A compares a transmission history of the transmitting device (node A) with a reception history of the old active communication device. Therefore, the dropped packets that have failed to be received by the old active communication device may be surely retransmitted to the new active communication device, thereby protecting occurrence of packet losses.

Further, a transmitting device may be configured to hold anti-replay window information as a reception history of an active communication device, where the data amount of the anti-replay window information is comparable with data amount that is needed for the case of using anti-replay window 50. Therefore, even when the anti-replay window information is stored in security association database 22, consumption of large amount of resources in the transmitting device may be avoided. In the same manner, it may not happen that large amount of resources are consumed in a redundant communication device that transmits anti-replay window information. Thus, packet losses may be prevented without consumption of large amount of resources in each of a transmitting device and redundant communication devices.

Further, since the same security association is shared among relevant nodes, a transmitting device may continue data transmission using the existing security association even when the destination address of a packet has been switched from an old active communication device to a new active communication device. Thus, switching between a pair of redundant communication devices may be performed rapidly without performing extra processing such as IKE.

(A Second Embodiment)

The first embodiment described above allows a transmitting device to perform switching between redundant communication devices together with retransmission of packets, and it is expected that processing may be performed rapidly. However, the load of the transmitting device may be enlarged. To reduce the load of the transmitting device, a system configuration may be changed such that a new active communication device controls switching between the pair of redundant communication devices instead of a transmitting device and the transmitting device performs retransmission of packets. In this case, the transmitting device may be configured without including redundancy controller 43. According to the second embodiment mentioned above, an active communication device may be configured to transmit a keep-alive message at regular intervals to a standby communication device. Therefore, according to the second embodiment, controller 10 of a communication device may be configured to include a component for controlling processing on a keep-alive message, an active-mode monitor such as heartbeat controller 15 or VRRP controller 16. According to the second embodiment, a communication device may be configured to further include a component for transmitting a keep-alive message, such as heartbeat transmitter 61 or VRRP advertisement transmitter 63, and a component for receiving a keep-alive message, such as heartbeat receiver 62 or VRRP advertisement receiver 64. Here, an arbitrary message form may be used for a keep-alive message that is transmitted from an active communication device to a standby communication device.

Figure 10:
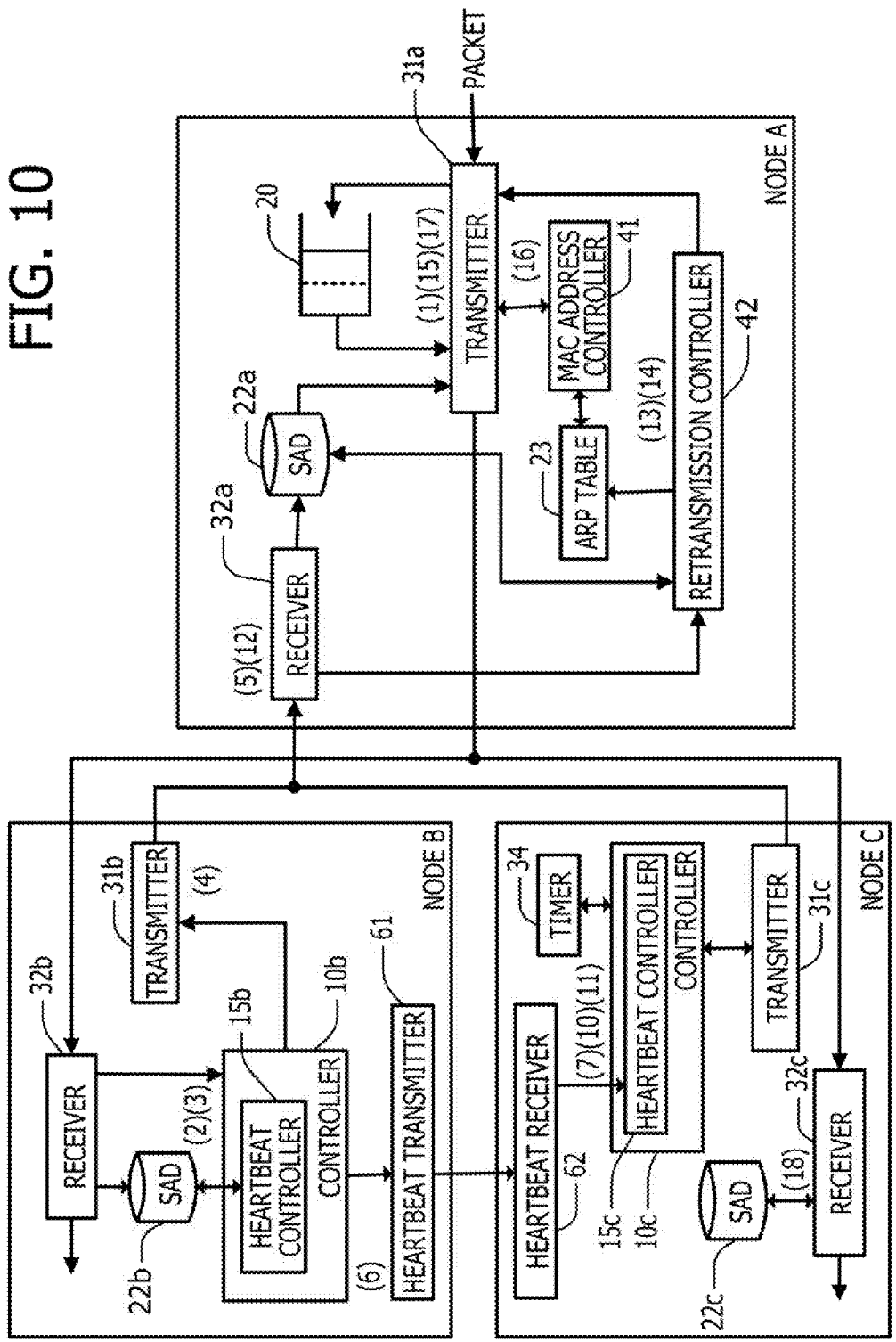
FIG. 10 is a diagram illustrating an example of an operational sequence for switching between redundant communication devices, according to an embodiment, in which a heartbeat message is used as a keep-alive message.

FIG. 10 is a diagram illustrating an example of an operational sequence for switching between redundant communication devices, according to an embodiment, in which a heartbeat message is used as a keep-alive message. Description will be given of operations performed by each node according to the second embodiment, with reference to FIG. 10. In FIG. 10, it is assumed that node A is a transmitting device, node B is an active communication device that will become an old active communication device, and node C is a standby communication device that will become a new active communication device. Here, it is also assumed that generating a security association and sharing the security association between the old active communication device and the new active communication device may be performed in a manner similar to the first embodiment. In the following description, for the convenience of explanation, operation numbers in parentheses will be added to each of the operations to be performed, and the same operation numbers are added to the relevant parts in FIG. 10.

As for operations from (1) to (4) according to the second embodiment are the same as the operations from (1) to (4) previously described with reference to FIG. 6, description thereof will be omitted here.

In operation (5), receiver 32a of node A stores the received anti-replay window information in security association database 22a.

In operation (6), in node B, heartbeat controller 15b generates a heartbeat message at regular intervals, and sends the generated heartbeat message to heartbeat transmitter 61 which then transmits the heartbeat message to node C.

In operation (7), heartbeat receiver 62 of node C, upon receiving the heartbeat message, sends the heartbeat message to heartbeat controller 15c. Heartbeat controller 15c, upon receiving the heartbeat message, resets a counter value of timer 34. Since heartbeat controller 15c resets the counter value of timer 34 every time receiving a heartbeat message, timer 34 is able to measure an elapsed time since node C has lastly received a heartbeat message from node B.

In operation (8), above mentioned operations from (1) to (7) are repeated until a fault occurrence in node B.

In operation (9), when a fault has occurred in node B, node B becomes unable to receive packets, unable to transmit anti-replay window information, and unable to transmit a heartbeat message.

In operation (10), node C does not reset timer 34 since node C is unable to receive a next heartbeat message from node B.

Thereafter, heartbeat controller 15c determines that node B has stopped the active mode thereof, for example, due to a fault occurrence in node B when the counter value of timer 34 exceeds a predetermined time value "T1".

In operation (11), switching request controller 12c of node C (not depicted in FIG. 10), upon receiving notification indicating that node B has stopped the active mode from heartbeat controller 15c, transmits a switching request message to node A via transmitter 31c.

In operation (12), receiver 32a of node A, upon receiving the switching request message, sends the received switching request message to retransmission controller 42 of node A. Operations after the switching request message has been sent to retransmission controller 42 may be performed in a manner similar to the operations (13) to (18) previously described with reference to FIG. 6.

Figure 11:
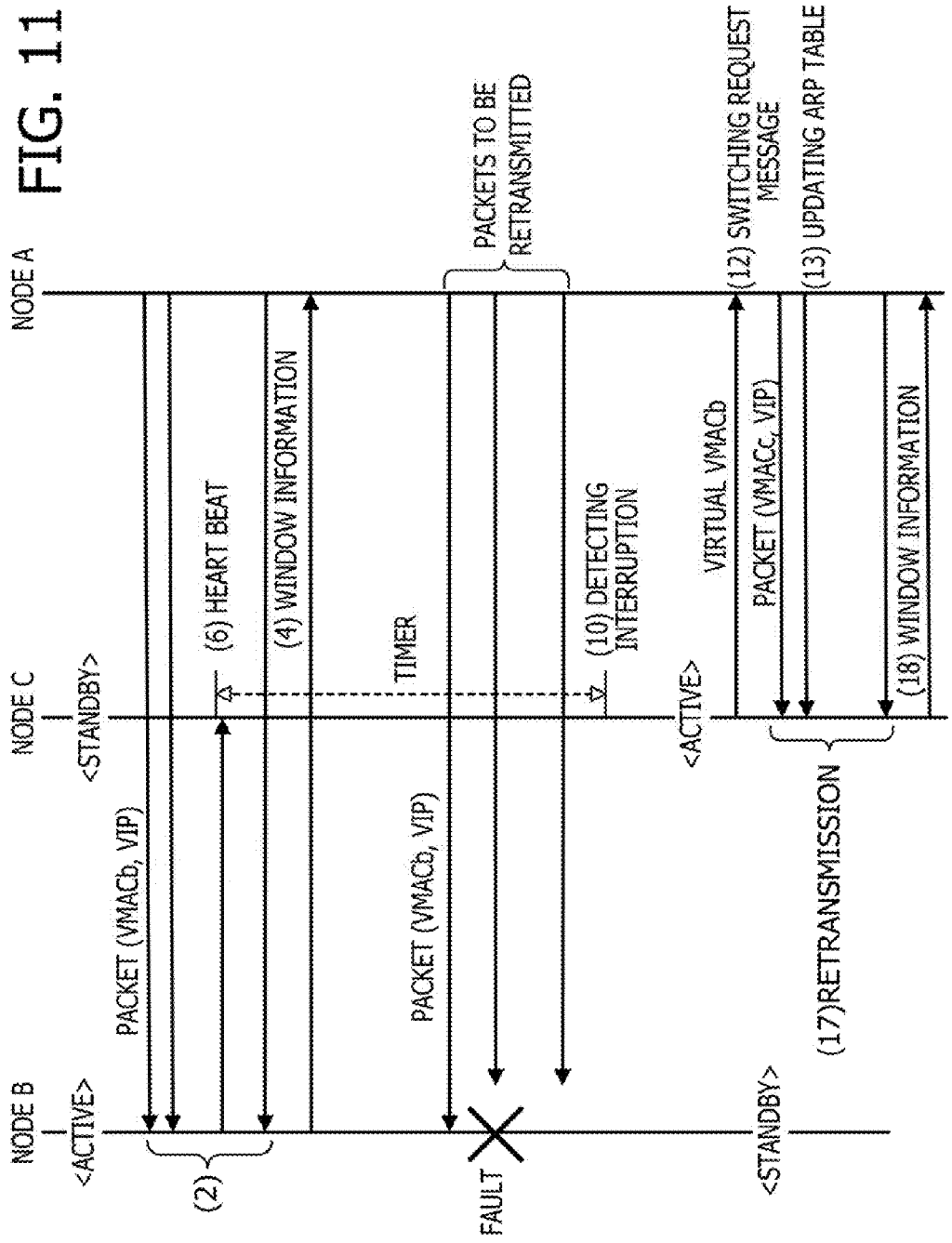
FIG. 11 is a diagram illustrating an example of a packet transmission sequence, according to an embodiment, in which a heartbeat message is used as a keep-alive message.

FIG. 11 is a diagram illustrating an example of a packet transmission sequence, according to an embodiment, in which a heartbeat message is used as a keep-alive message. In FIG. 11, packets are transmitted from a transmitting device (node A) to an active communication device (node B) before a fault occurrence in the active communication device (node B). The active communication device (node B) transmits, as a keep-alive message, a heartbeat message to a standby communication device (node C) at regular intervals. Further, the active communication device (node B) transmits anti-replay window information to the transmitting device (node A).

When a fault has occurred in node B (an active communication device), transmission of a heartbeat message from node B to node A is stopped. Therefore, node C determines that node B has stopped the active mode thereof, for example due to a fault occurrence in node B, and transmits a switching request message to node A. Node A, upon receiving the switching request message, updates ARP table 23 and starts transmission of packets to node C. At this time, node A compares the anti-replay window information stored in security association database 22a with sequence numbers of packets that have been transmitted from node A to node B, and retransmits to node C packets that have failed to be received by node B. As depicted in FIG. 11, it is also possible for node B to transmit a heartbeat message to node C before anti-replay window information is transmitted from node B to node A. In this case, operations (6), (7) may be performed before operations (2) to (5).

A keep-alive message to be used for the second embodiment is not limited to a heartbeat message, and, for example, it is also possible to use a VRRP advertisement as a keep-alive message.

Figure 12:
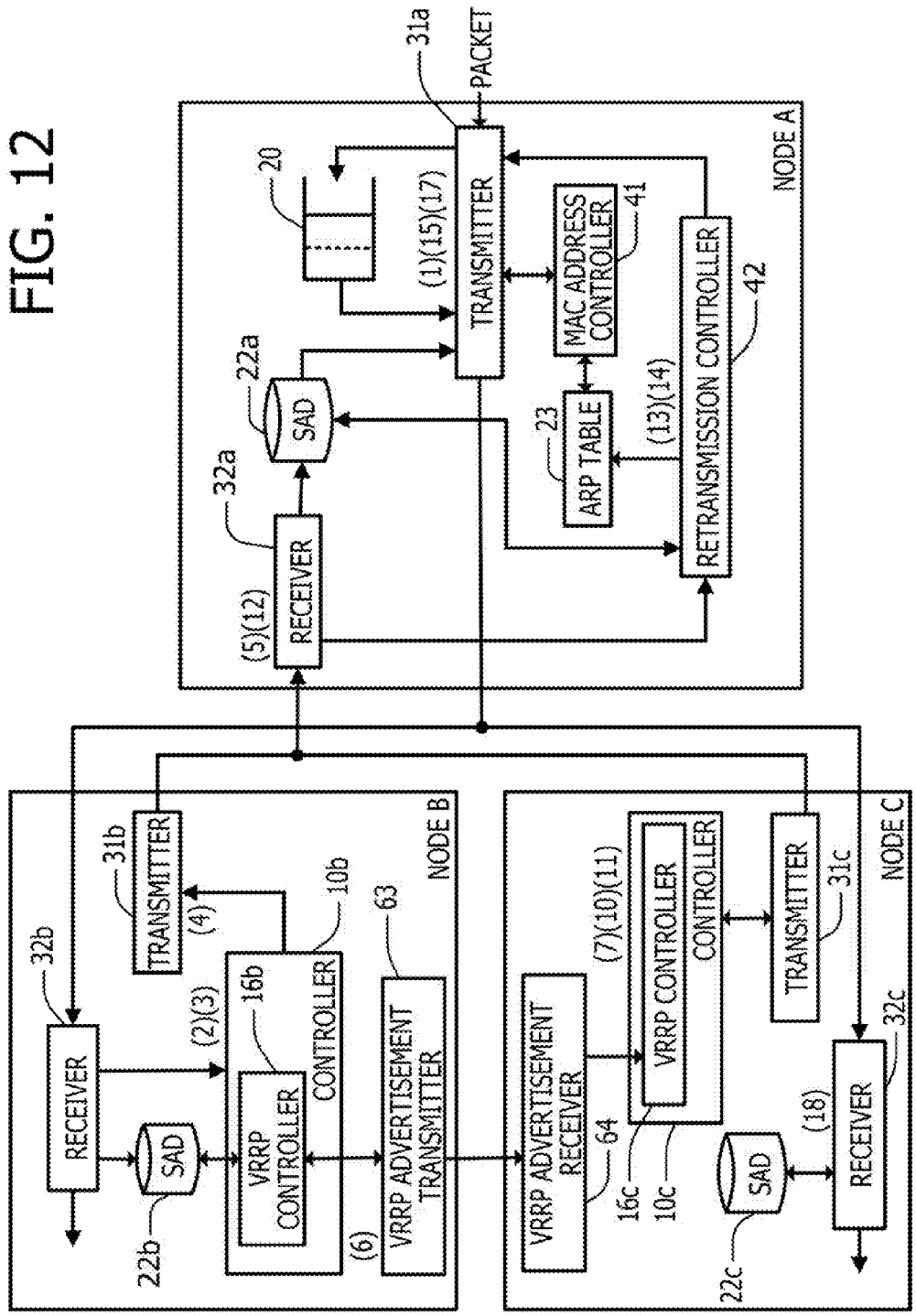
FIG. 12 is a diagram illustrating an example of an operational sequence for switching between redundant communication devices, according to an embodiment, in which a VRRP advertisement is used as a keep-alive message.
Figure 13:
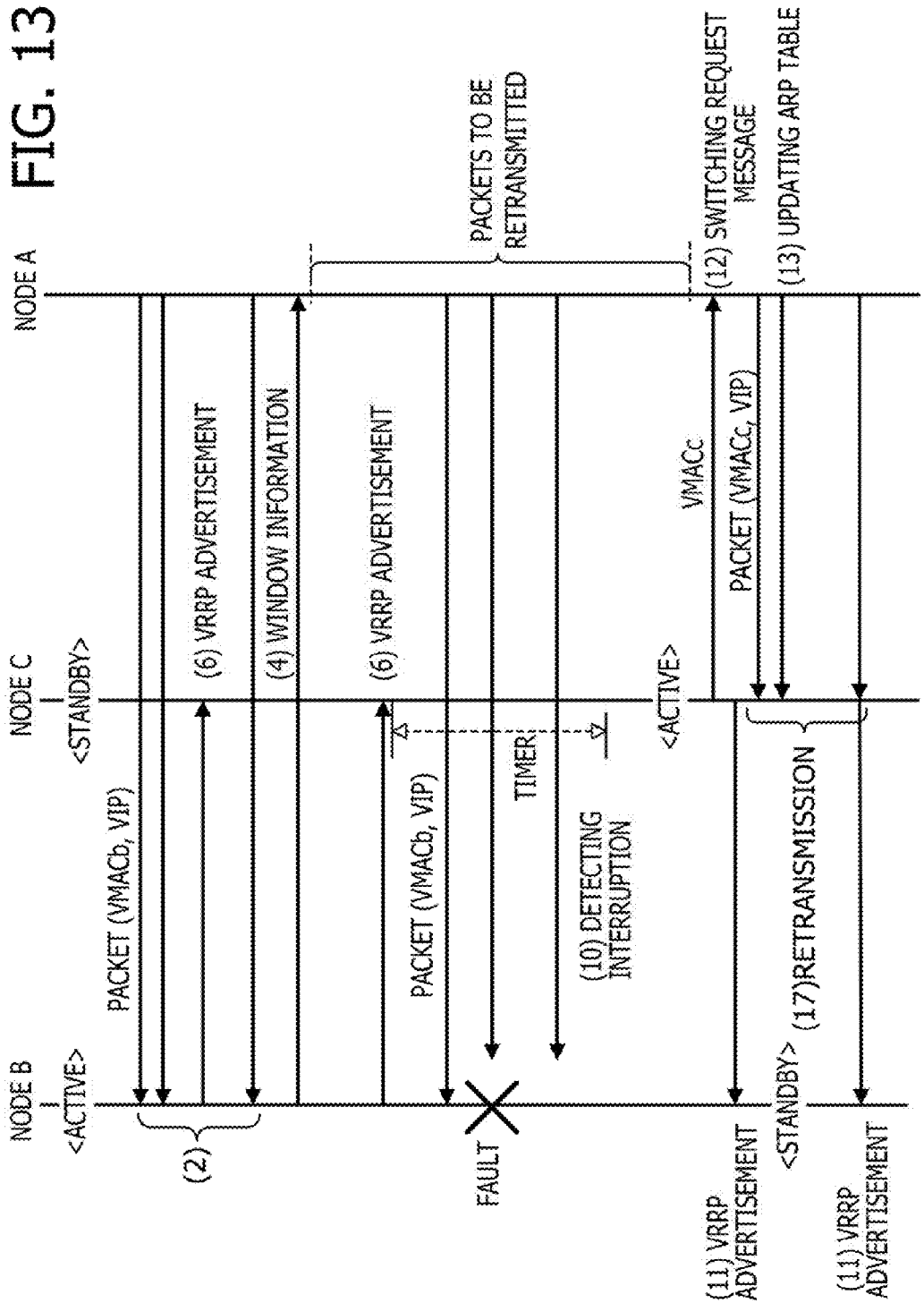
FIG. 13 is a diagram illustrating an example of a packet transmission sequence, according to an embodiment, in which a VRRP advertisement is used as a keep-alive message.

FIG. 12 is a diagram illustrating an example of an operational sequence for switching between redundant communication devices, according to an embodiment, in which a VRRP advertisement is used as a keep-alive message. FIG. 13 is a diagram illustrating an example of a packet transmission sequence, in which the packet transmission sequence is depicted in association with the operational sequence depicted in FIG. 12 using operation numbers in parentheses. Here, since operations (1) to (5) are performed in a manner similar to operations (1) to (5) previously described with reference to FIG. 10, description thereof omitted.

In operation (6), in node B, VRRP controller 16b transmits a VRRP advertisement to node C via VRRP advertisement transmitter 63, at regular intervals.

In operation (7), VRRP controller 16c of node C receives the VRRP advertisement via VRRP advertisement receiver 64. At the same time, VRRP controller 16c measures an elapsed time from lastly receiving a VRRP advertisement until receiving a next VRRP advertisement.

In operation (8), the above operations from (1) to (7) are repeated until a fault occurrence in node B.

In operation (9), when a fault has occurred in node B, node B becomes unable to receive packets, unable to transmit anti-replay window information, and unable to transmit a VRRP advertisement.

In operation (10), node C determines that node B has stopped the active mode thereof, for example, due to a fault occurrence in node B when node C has failed to receive a next VRRP advertisement within a predetermined time period "T2".

In operation (11), switching request controller 12c of node C (not depicted in FIG. 12), upon receiving from VRRP controller 16c notification indicating that node B has stopped the active mode thereof, transmits a switching request message to node A via transmitter 31c. Further, node C determines that node B has shifted to a standby mode, and transmits a VRRP advertisement to node B, as depicted in FIG. 13.

Operations after the switching request message has been transmitted to node A may be performed in a manner similar to the operations (12) to (18) previously described with reference to FIG. 10.

As described above with reference to FIGS. 10 to 13, the second embodiment allows a standby communication device to monitor whether an active communication device is operating normally or not instead of a transmitting device, thereby reducing the load of the transmitting device. Further, packet loss may be also prevented in a manner similar to the first embodiment.

(A Third Embodiment)

In order to further reduce processing load of a transmitting device according to the second embodiment, it is also possible for a new active communication device to perform controlling a reception history and switching between redundant communication devices, instead of the transmitting device.

Figure 14:
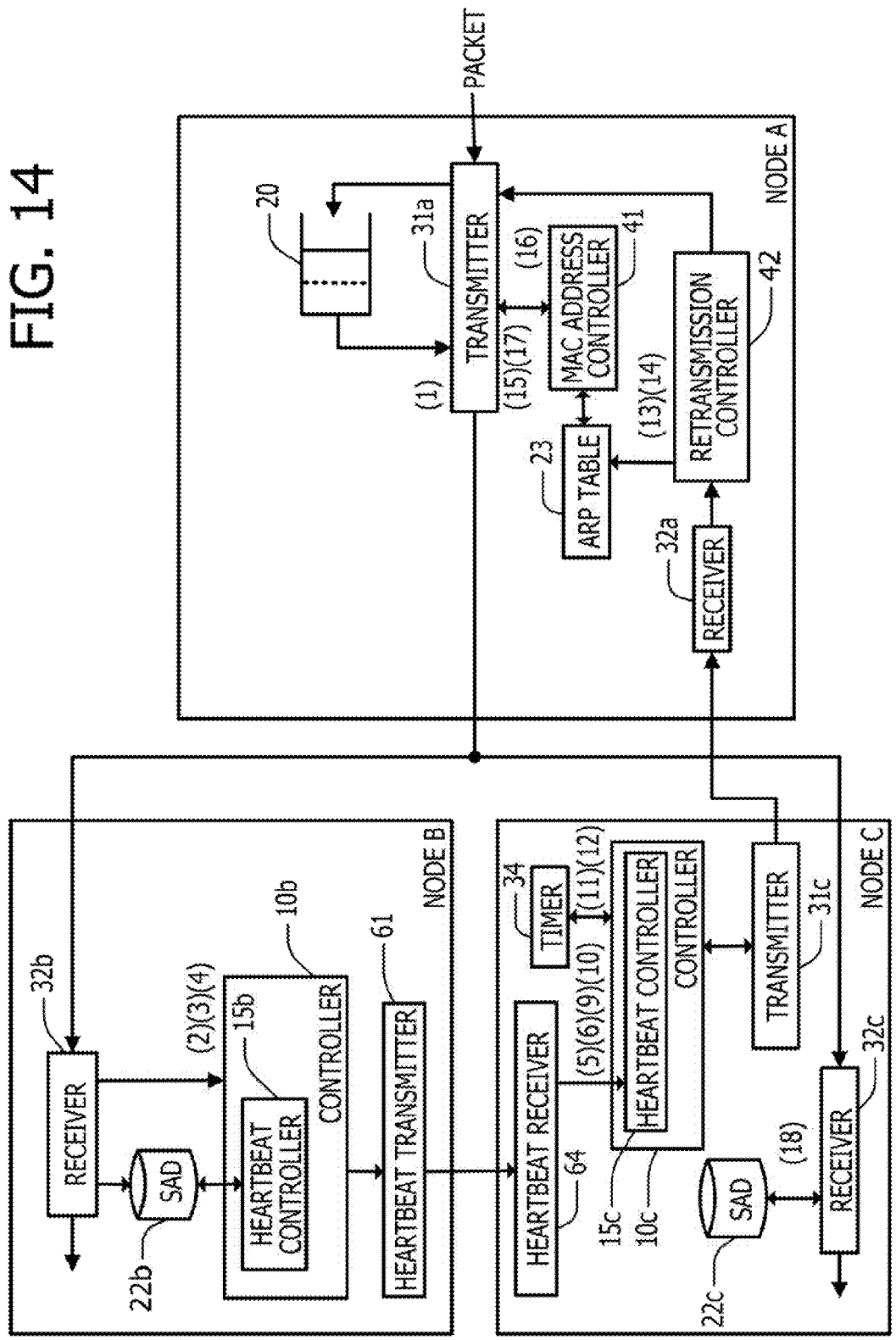
FIG. 14 is a diagram illustrating an example of an operational sequence for switching between redundant communication devices, according to an embodiment, in which a heartbeat message is used as a keep-alive message.
Figure 15:
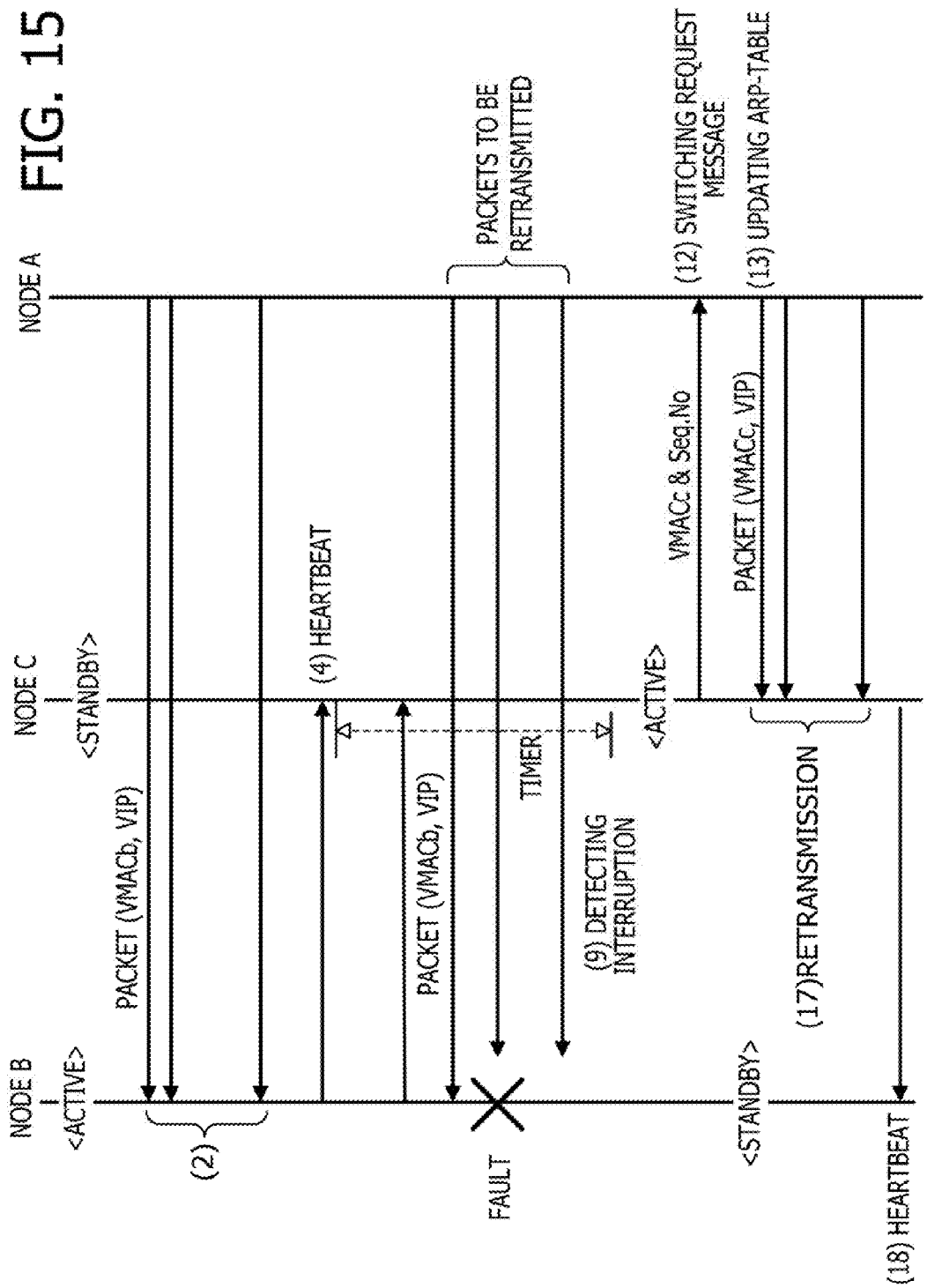
FIG. 15 is a diagram illustrating an example of a packet transmission sequence, according to an embodiment, in which a heartbeat message is used as a keep-alive message.

FIG. 14 is a diagram illustrating an example of an operational sequence for switching between redundant communication devices, according to an embodiment, in which a heartbeat message is used as a keep-alive message. FIG. 15 is a diagram illustrating an example of a packet transmission sequence, in which the packet transmission sequence is depicted in association with the operational sequence depicted in FIG. 14 using operation numbers in parentheses. Here, operations (1), (2) according to the third embodiment may be performed in a manner similar to the operations (1), (2) previously described with reference to FIG. 6, and the description thereof will be omitted.

In operation (3), heartbeat controller 15b of node B monitors, for example, the number of packets that have been received from node A since a heartbeat message was lastly transmitted from node B to node C, and determines, based on the monitored number of packets, the timing at which a next heartbeat message is to be transmitted from node B.

In operation (4), heartbeat controller 15b of node B generates a heartbeat message including anti-replay window information. According to the third embodiment, a heartbeat message may be configured as an arbitrary form of message including anti-replay window information. Heartbeat controller 15b of node B transmits the heartbeat message to node C via heartbeat transmitter 61.

In operation (5), heartbeat receiver 62 of node C, upon receiving the heartbeat message, sends the received heartbeat message to heartbeat controller 15c. Heartbeat controller 15c extracts the anti-replay window information of node B from the received heartbeat message, and stores the extracted anti-replay window information in security association database 22c.

In operation (6), heart beat controller 15c of node C, upon receiving a heartbeat message, resets the counter value of timer 34. Therefore, timer 34 is able to measure an elapsed time since node C lastly received a heartbeat message from node B, until node C receives a next heartbeat message from node B.

In operation (7), the operations from (1) to (6) described above are repeated by nodes A, B, or C.

In operation (8), when a fault has occurred in node B, node B becomes unable to receive packets and unable to transmit a heartbeat message.

In operation (9), timer 34 of node C is not reset by node C since node C is unable to receive a next heartbeat message. As a result, heartbeat controller 15c of node C determines that node B has stopped the active mode thereof, for example, due to a fault occurrence in node B when the count value of timer 34 exceeds a predetermined time period "T3".

In operation (10), switching request controller 12c of node C (not depicted in FIG. 14) receives notification indicating that node B has stopped the active mode thereof, and reads out the anti-replay window information of node B from security association database 22c.

In operation (11), switching request controller 12c of node C generates a switching request message. FIG. 7B illustrates an example of a switching request message. The switching request message depicted in FIG. 7B includes anti-replay window information. ENA (Enablement) field of the switching request message indicates validity of the anti-replay window information. For example, when value "1" indicating that the anti-replay window information is valid is set to ENA field, the anti-replay window information stored in the switching request message may be used as a reception history. Further, for example, an OP field may be used for identifying whether a reception history is stored in the switching request message or not. For example, in the case of a heartbeat message including anti-replay window information, value "1" may be set to the OP field in order to identify that the reception history is stored in the switching request message. Here, the other field depicted in FIG. 7B may be used in a manner similar to the fields depicted in FIG. 7A.

In operation (12), switching request controller 12c of node C (not depicted in FIG. 14) transmits the generated switching request message to node A via transmitter 31c.

In operation (13), receiver 32a of node A sends the switching request message to retransmission controller 42. Then, retransmission controller 42 updates ARP table 23 by analyzing the received switching request message, and changes a destination of outgoing packets from node B to node C.

In operation (14), retransmission controller 42 of node A further request transmitter 31a to transmit packets to be retransmitted. Here, retransmission controller 42 determines sequence numbers of packets that have failed to be received by node B, with reference to the anti-replay window information stored in the switching request message, and informs transmitter 31a of the determined sequence numbers of the packets.

Operations that are performed since node B was informed of the sequence numbers of the packets until the packets is retransmitted to node C, may be similar to the operations from (15) to (17) previously described with reference to FIG. 6, and the description thereof will be omitted here.

In operation (18), node C, upon receiving a packet from node A, stores the sequence number of the received packet in the sequence number counter. Further, node C stores anti-replay window information in security association database 22c on a timely basis. As depicted in FIG. 15, node C transmits to node B a heartbeat message in which anti-replay window information is included.

As mentioned above, according to the third embodiment, the processing load of a transmitting device may be reduced since a standby communication device performs both the monitoring of whether an active communication device is operated normally and the management of a reception history of the active communication device. Further, packet loss may be also avoided in a manner similar to the first embodiment.

Further, a system may be configured such that a new active communication device extracts packets to be retransmitted. Hereinafter, description will be given of an example of the case in which a new active communication device informs a transmitting device of packets to be retransmitted using a VRRP advertisement as a keep-alive message.

Figure 16:
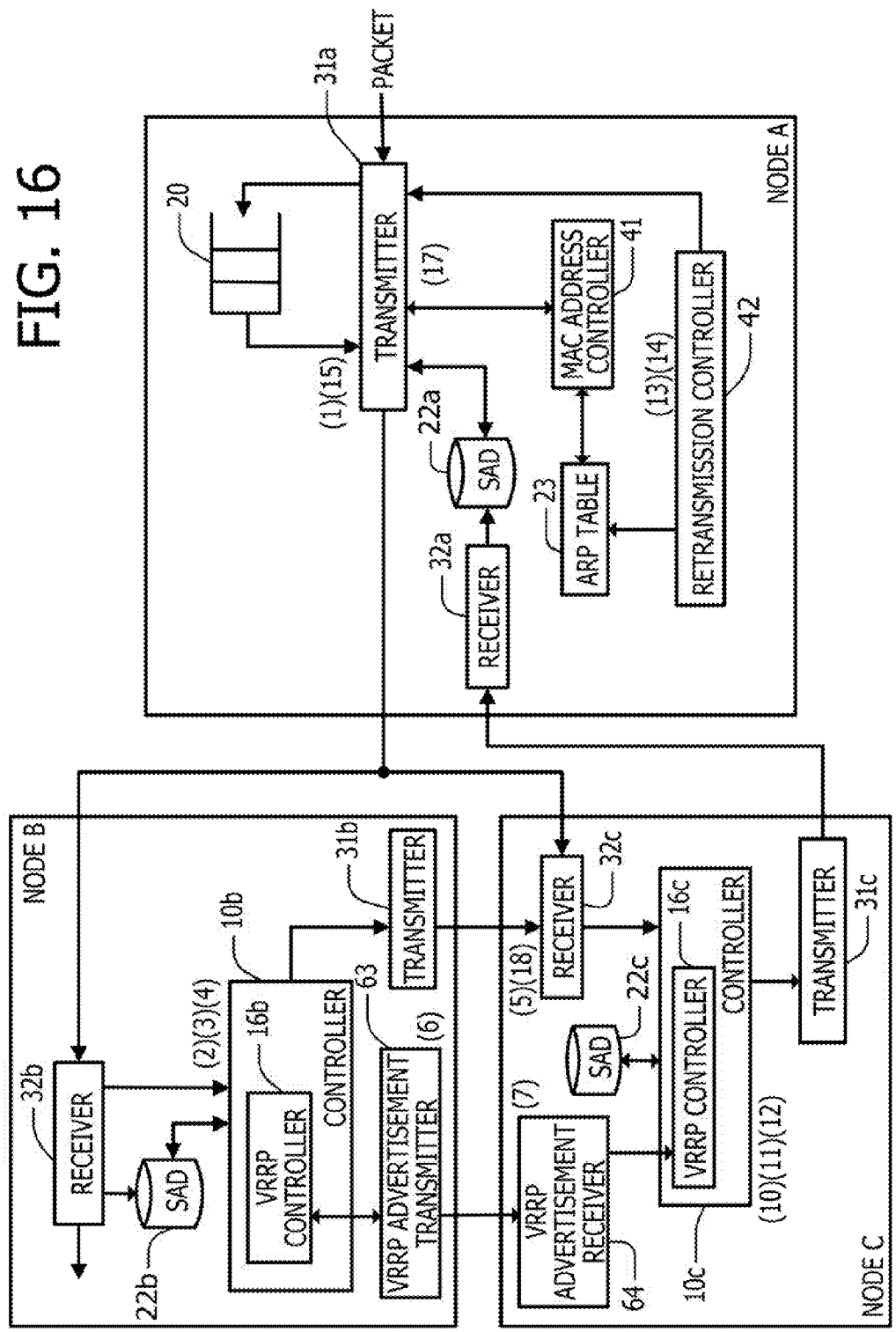
FIG. 16 is a diagram illustrating an example of an operational sequence for switching between redundant communication devices, according to an embodiment, in which a VRRP advertisement is used as a keep-alive message.
Figure 17:
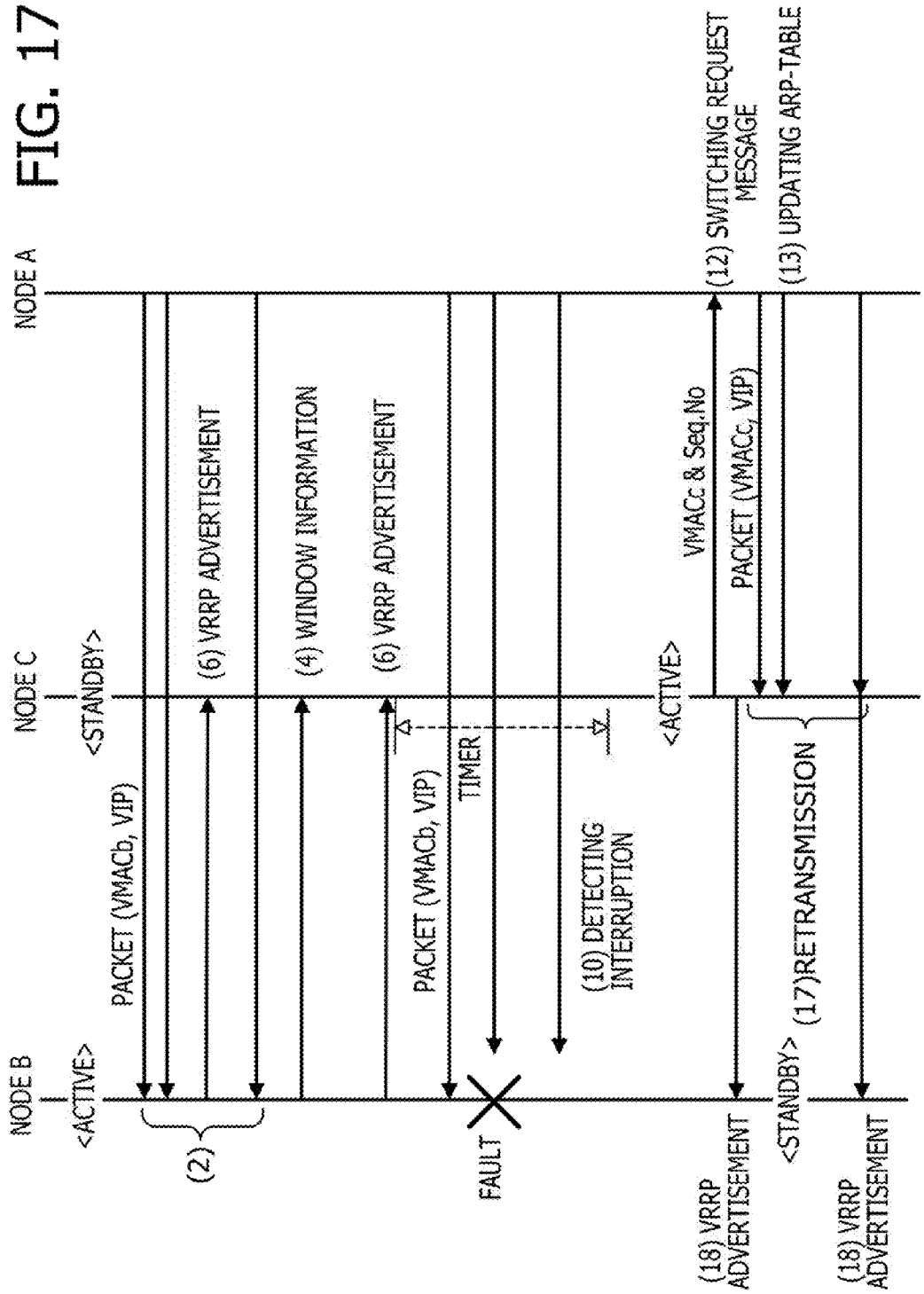
FIG. 17 is a diagram illustrating an example of a packet transmission sequence, according to an embodiment, in which a VRRP advertisement is used as a keep-alive message.

FIG. 16 is a diagram illustrating an example of an operational sequence for switching between redundant communication devices, according to an embodiment, in which a VRRP advertisement is used as a keep-alive message. FIG. 17 is a diagram illustrating an example of a packet transmission sequence, in which the packet transmission sequence is depicted in association with the operational sequence of FIG. 16 using operation numbers in parentheses. Here, operations (1), (2) of FIG. 16 may be performed in a manner similar to operations (1), (2) previously described with reference to FIG. 6, and description thereof will be omitted.

In operation (3), reception history notifier 14b of node B may be configured to determine the timing at which anti-replay window information is to be transmitted, for example, by monitoring the number of packets that have been received from node A after lastly transmitting anti-replay window information to node C.

In operation (4), reception history notifier 14b of node B transmits anti-replay window information to node C.

In operation (5), controller 10c of node C, upon receiving anti-replay window information via receiver 32c, stores the received anti-replay window information in security association database 22c.

In operation (6), in node B, VRRP controller 16b transmits a VRRP advertisement to node C via VRRP advertisement transmitter 63 at regular intervals.

In operation (7), VRRP controller 16c of node C receives a VRRP advertisement via VRRP advertisement receiver 64. Here, VRRP controller 16c measures an elapsed time from lastly receiving a VRRP advertisement until receiving a next VRRP advertisement.

In operation (8), the above mentioned operations (1) to (7) are repeated until a fault occurrence in node B.

In operation (9), when a fault has occurred in node B, node B becomes unable to perform the following processing: reception of packets, transmission of anti-replay window information, and transmission of a VRRP advertisement.

In operation (10), node C determines that node B has stopped the active mode thereof, for example, due to a fault occurrence in node B when a next VRRP advertisement has not been received by node C within a predetermined time period "T4".

In operation (11), switching request controller 12c of node C (not depicted in FIG. 16), upon receiving from VRRP controller 16c a notification indicating that node B has stopped the active mode thereof, reads out the anti-replay window information of node B that is stored in security association database 22c, and determines sequence numbers of packets that have failed to be received by node B. Switching request controller 12c generates a switching request message including the determined sequence numbers of the packets.

Operations (12) to (17) may be performed in a manner similar to the operations (12) to (17) previously described with reference to FIG. 14, and retransmission controller 42 reads out, from the switching request message, sequence numbers of packets that have failed to be received by node B, and informs transmitter 31a of the sequence numbers.

In operation (18), node C, upon receiving a packet, stores the sequence number of the received packet in the sequence number counter. Further, node C stores anti-replay window information in security association database 22c on a timely basis, and transmits a VRRP advertisement to node B as depicted in FIG. 17.

In this way, a new active communication device identifies packets that have failed to be received by an old active communication device, and informs a transmitting device of the sequence numbers of the identified packets. Then, the transmitting device retransmits the packets corresponding to the informed sequence numbers.

As mentioned above, in any of the embodiments, a switching request message may be utilized as a retransmission request of packets that have failed to be received by an old active communication device. That is, a transmitting device, upon receiving a switching request message from a new active communication device, transmits packets that have failed to be received by the old active communication device to the new active communication device after switching between communication devices has completed. Thus, according to any one of the embodiments, the occurrence of packet losses caused by switching between the redundant communication devices may be prevented.

Further, "anti-replay window information" may be used as a reception history of an active communication device in any one of the embodiments. As described above, since the data amount of anti-replay window information is comparable to data amount needed for anti-replay window 50, it is unlikely that large amount of resources are consumed by transmission and recording of anti-replay window information. Therefore, packet loss may be prevented without consuming large amount of resources of each of a transmitting device or redundant communication devices.

Here, it is noted that the present inventions are not limited the above mentioned embodiments, but various changes could be made, and some example will be given hereinafter.

Figure 18:
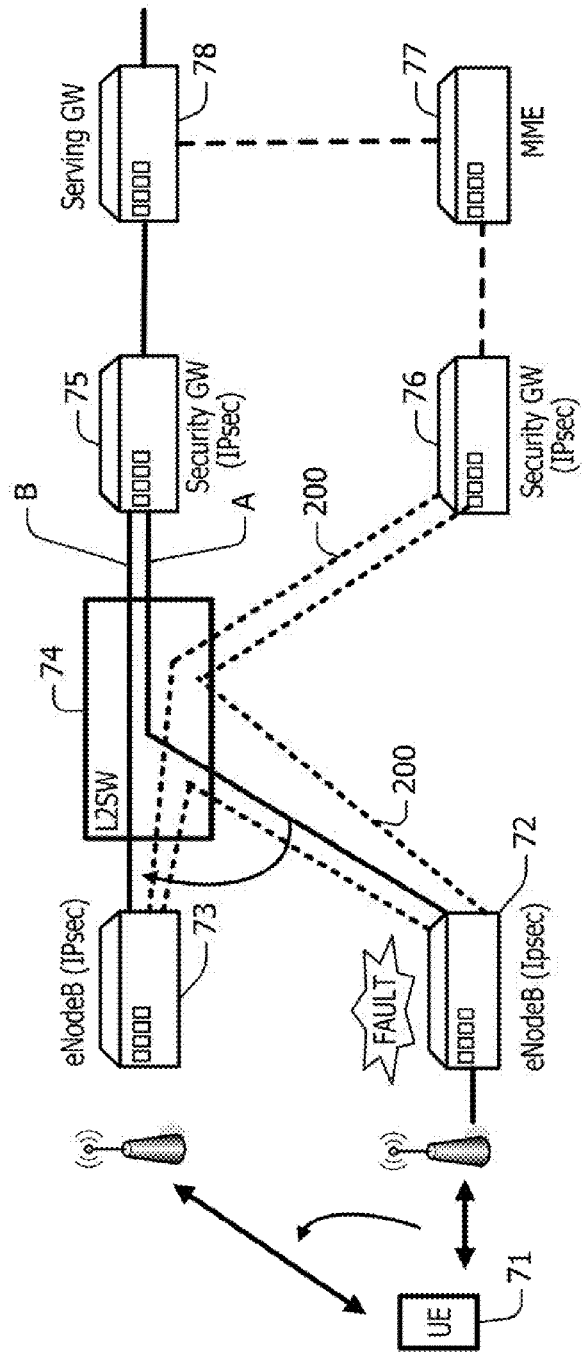
FIG. 18 is a schematic diagram illustrating an example of a radio network system, according to an embodiment.

FIG. 18 is a schematic diagram illustrating an example of a radio network system, according to an embodiment. FIG. 18 illustrates an example of a network in which Long Term Evolution (LTE) is applied. The network includes base stations 72, 73 (evolved Node B, or eNodeB), Layer 2 switch (L2SW) 74, security gateways 75, 76, Mobile Management Entity (MME) 77, and serving gateway 78. Base stations 72, 73 relay a packet having a destination address of terminal 71 by performing data transmission to terminal 71. Serving gateway 78 transmits data to terminal 71 via a base station. Here, it is assumed that data transmission may be performed using a tunnel mode of IPsec between service gateway 78 and base station 72 or 73, or between base stations 72 and 73. Further, it is also assumed that data transmission according to IPsec may be performed between MME 77 and base station 72 or 73. In FIG. 18, each of solid lines A and B indicates a route through which user plane (U-Plane) data is transmitted. Further, a dotted line depicted in FIG. 18 indicates a route through which control plane (C-Plane) data such as a switching request message is transmitted. In the following example, it is assumed that base station 72 functions as an old active communication device, base station 73 functions as a new active communication device, and security gateways 75 functions as a transmitting device, and description will be given in the case of the third embodiment.

Terminal 71 receives data from security gateways 75 via base station 72 until a fault occurrence in base station 72. At this time, user plane data is transmitted to base station 72 through route A. Base station 73 receives a keep-alive message from base station 72 at regular intervals.

When a fault has occurred in base station 72, base station 72 stops transmission of a keep-alive message. Base station 73 determines that a fault has occurred in base station 72 when a next keep-alive message has not been received for a predetermined time period, and transmits switching request message to security gateway 75. Further, base station 73 changes a device that accommodates terminal 71 from base station 72 to base station 73.

Security gateway 75 determines packets that have been transmitted to base station 72 but failed to be received by base station 72, based on the switching request message, and transmits the determined packets to base station 73. L2SW 74 transmits user plane data (the determined packets) to base station 73 through route B. Base station 73 transmits the received packets to terminal 71.

As mentioned above, terminal 71 may receives packets from base station 73 when a fault has occurred in base station 72. Further, packets not recorded in the reception history of base station 72 that is held by base station 73 are transmitted to terminal 71 via base station 73, thereby preventing packet losses. Here, although description was given of an example of the third embodiment with reference to FIG. 18, any one of the embodiments may be applied to a radio network system. Further, LTE is an example of a radio network system, and any one of the embodiments may be applied to arbitrary type of radio network other than LTE.

The example of a message depicted in FIG. 7B is an example of a switching request message that is used for the third embodiment. For example, a system configuration may be modified such that a switching request message including the minimum value among sequence numbers of packets that have failed to be received by an old active communication device, is transmitted to a transmitting device. In this case, the transmitting device may be configured to retransmit packets with sequence numbers equal to or greater than the minimum sequence number included in the switching request message, so that the new active communication device receives the packets that have failed to be received by the old active communication device. Here, it is assumed that the old active communication device transfers the normally received packets to the new active communication device. Therefore, for example, it may be possible that the old active communication device that has failed to receive (m)-th packet, successfully receive (m+1)-th packet and transmits the (m+1)-th packet to the new active communication device. In this case, the new active communication device may be configured to discard packets that have been received by the old active communication device, using anti-replay window information of the old active communication device.

By the modification as mentioned above, data amount needed for determining retransmission packets may be reduced to be less than the data amount of anti-replay window information. Therefore, the above modification may be applied to the case in which, for example, data amount to be embedded in the switching request message is required to be reduced.

In any one of the above mentioned embodiments, for the sake of clarity, description was given of the case in which the number of redundant communication devices is two. However, the number of redundant communication devices may be changed to an arbitrary number. In the case where the number of redundant communication devices is equal to or greater than three, a system may be configured such that priority order is beforehand assigned to each of redundant communication devices, and data transmission according to any one of the embodiments may be applied to a pair of communication devices having the first and second highest priority order. Further, in the second or third embodiment in which a heartbeat message is used as a keep-alive message, a communication device that is to receive a keep-alive message may be selected in the order of priority assigned to the communication device such that a communication device with higher priority is selected preferentially. For example, in the case of a system including three redundant communication devices, a communication device with priority "1" becomes an active communication device that will become an old active communication device, a communication device with priority "2" becomes a standby communication device that will become a new active communication device, and a keep-alive message is not transmitted to a communication device with priority "3" during the time period the active communication device is being operated normally. After the new active communication device is set as a destination of data transmission due to a fault occurrence in the old active communication device, the new active communication device becomes able to transmit a keep-alive message to a communication device with priority "3".

Further, any one of the embodiments may be applied to the case in which a redundant communication device receives packets from a transmitting device and further transmits packets to another redundant communication device. For example, any one of the above mentioned embodiments may be applied to the case in which, after node A transmits packets to one of nodes B and C that is being operated, the one of nodes B and C that is in an active mode further transmits packets to another redundant communication device. In this case, controller 10 of node B or node C may be configured to include mode controller 11, switching request controller 12, security information manager 13, reception history notifier 14, MAC address controller 41, retransmission controller 42, and redundancy controller 43. Further, memory 20 may be configured to include security policy database 21, security association database 22, and ARP table 23.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:
1. An apparatus, comprising:
redundant communication devices; and
a transmitting device configured to transmit a packet to the redundant communication devices, wherein
the transmitting device includes:
a) a transmitter configured to transmit a packet to one of the redundant communication devices including an active communication device and a standby communication device, the active communication device being in an operational mode of an active mode, the standby communication device being in the operational mode of a standby mode;

b) a receiver configured to receive a switching request message from one of redundant communication devices, the switching request message including a reception history identifying packets that have been transmitted from the transmitting device and have been successfully received by the active communication device, the reception history being configured to store a predetermined number of pieces of flag information each associated with a sequence number assigned to each packet transmitted from the transmitting device to the active communication device, the flag information indicating whether the each packet has been successfully received by the active communication device, the reception history being included in a keep-alive message transmitted between the redundant communication devices;

c) a media access control (MAC) address controller configured:
to extract a media access control (MAC) address of the active communication device from an address resolution protocol (ARP) table, the ARP table storing a shared internet protocol (IP) address assigned to the redundant communication devices in association with one of the redundant communication devices that is in the active mode, and
to notify the transmitter of the extracted MAC address as a destination address of the packet; and d) a retransmission controller configured:
to change a destination of the packet, from an old active communication device that has lastly stopped the active mode, to a new active communication device that has newly changed the operational mode from the standby mode to the active mode, upon receiving from the new active communication device the switching request message for changing a destination of the packet from the old active communication device to the new active communication device, the switching request message including a reception history of the old active communication device,
to determine retransmission packets that are to be retransmitted to the new active communication device, the retransmission controller determining, as the retransmission packets, packets that have been transmitted from the transmitting device to the old active communication device and have failed to be received by the old active communication device, by comparing the reception history of the old active communication device with a transmission history identifying packets that have been transmitted from the transmitting device to the old active communication device, and
to transmit the determined retransmission packets to the new active communication device.

2. The apparatus of claim 1, wherein each of the redundant communication devices includes:
a heart beat transmitter configured to transmit the keep-alive message at regular intervals to the standby communication device, the keep-alive message including the reception history of the active communication device;
a heart beat receiver configured to receive the keep-alive message from the active communication device;
a receiver configured to receive the packet from the transmitting device;
a mode controller configured to change the operational mode of the each redundant communication device; and
a switching request controller configured to transmit the switching request message including the reception history of the old active communication device to the transmitting device when the mode controller changed the operational mode of the each redundant communication device from the standby mode to the active mode, the switching request message requesting the transmitting device to change a destination of the packet, wherein, in the case of the each redundant communication device being in the standby mode,
the mode controller changes the operational mode of the each redundant communication device from the standby mode to the active mode so that the each redundant communication device becomes a new active communication device, when the each redundant communication device fails to receive the keep-alive message from the active communication device within a predetermined time period,
the switching request controller transmits to the transmitting device the switching request message including the reception history, of the old active communication device, extracted from the keep-alive message received from the old active communication device so as to request the transmitting device to change the destination of the packet from the active communication device to the new active communication device, and
the receiver receives, from the transmitting device, the retransmission packets defined as packets that have been transmitted from the transmitting device to the old active communication device and have failed to be received by the old active communication device.

3. The apparatus of claim 2, wherein
the switching request message is configured to store the reception history in a padding field of a gratuitous address resolution protocol (GARP) packet.

4. The apparatus of claim 2, wherein
the switching request controller determines, using the reception history, retransmission-packet identifiers identifying packets to be retransmitted from the transmitting device to the new active communication device when the active-mode monitor has determined that the active communication device has stopped the active mode thereof, and
the switching request controller transmits the switching request message including the determined retransmission-packet identifiers to the transmitting device so that the transmitting device retransmits packets identified by the determined retransmission-packet identifiers to the new active communication device.

5. A method for switching between redundant communication devices that handle a packet received from a transmitting device, the redundant communication devices including an active communication device and a standby communication device, the active communication device being in an operational mode of an active mode and capable of receiving the packet from the transmitting device, the standby communication device being in the operational mode of a standby mode, the method comprising:
providing the transmitting device with an address resolution protocol (ARP) table that stores a shared internet protocol (IP) address assigned to the redundant communication devices in association with a media access control (MAC) address of one of the redundant communication devices that is in the active mode;

extracting, by the transmitting device, from the ARP table, the MAC address of the active communication device;

transmitting, by the transmitting device, a packet to the active communication device by using the extracted MAC address;

transmitting, by the active communication device, a keep-alive message at regular intervals to the standby communication device, the keep-alive message including a reception history identifying packets that have been transmitted from the transmitting device to the active communication device and have been successfully received by the active communication device, the reception history being configured to store a predetermined number of pieces of flag information each associated with a sequence number assigned to each packet transmitted from the transmitting device to the active communication device, the flag information indicating whether the each packet has been successfully received by the active communication device;

determining, by the standby communication device, that the active communication device has stopped the active mode thereof when the standby communication device has failed to receive the keep-alive message from the active communication device;

changing, by the standby communication device, the operational mode thereof from the standby mode to the active mode so that the standby communication device becomes a new active communication device;

transmitting, by the new active communication device, to the transmitting device a switching request message for switching a destination of the packet from the old active communication device to the new active communication device, the switching request message including the reception history, of the old active communication device, extracted from the keep-alive message received from the old active communication device;

determining, by the transmitting device, packets that have been transmitted from the transmitting device to the old active communication device and have failed to be received by the old active communication device, based on the reception history included in the switching request message received from the new active communication device, by comparing the reception history with a transmission history identifying packets that have been transmitted from the transmitting device to the active communication device; and retransmitting, by the transmitting device, the determined packets to the new active communication device.

* * * * *